(12) United States Patent
Mohanty et al.

(10) Patent No.: US 11,247,365 B2
(45) Date of Patent: Feb. 15, 2022

(54) ADDITIVE FABRICATION METHODS AND DEVICES FOR MANUFACTURE OF OBJECTS HAVING PREFORM REINFORCEMENTS

(71) Applicant: Somnio Global Holdings, LLC, Novi, MI (US)

(72) Inventors: Pravansu S. Mohanty, Canton, MI (US); Zhuoran Wang, Dearborn, MI (US); Ramcharan Visveswaran, Westland, MI (US)

(73) Assignee: Somnio Global Holdings, LLC, Novi, MI (US)

( * ) Notice: Subject to any disclaimer, the term of this patent is extended or adjusted under 35 U.S.C. 154(b) by 371 days.

(21) Appl. No.: 16/098,514

(22) PCT Filed: May 4, 2017

(86) PCT No.: PCT/US2017/031088
§ 371 (c)(1),
(2) Date: Nov. 2, 2018

(87) PCT Pub. No.: WO2017/192866
PCT Pub. Date: Nov. 9, 2017

(65) Prior Publication Data
US 2019/0143565 A1 May 16, 2019

Related U.S. Application Data

(60) Provisional application No. 62/331,713, filed on May 4, 2016.

(51) Int. Cl.
*B29C 70/30* (2006.01)
*B29B 15/10* (2006.01)
(Continued)

(52) U.S. Cl.
CPC ............ *B29B 15/105* (2013.01); *B22F 12/00* (2021.01); *B29B 11/16* (2013.01); *B29B 15/12* (2013.01);
(Continued)

(58) Field of Classification Search
CPC ...... B29B 15/105; B29C 70/50; B29C 70/465
See application file for complete search history.

(56) References Cited

U.S. PATENT DOCUMENTS 3,066,061 A * 11/1962 Winslow .................. C08K 7/04
428/221
3,437,783 A * 4/1969 Lemelson ............ B23K 11/002
219/117.1
(Continued)

FOREIGN PATENT DOCUMENTS

| EP | 0276041 A2 | 7/1988 |
|---|---|---|
| EP | 2664643 A1 | 11/2013 |
| WO | 2015-109096 A1 | 7/2015 |

*Primary Examiner* — Matthew J Daniels
(74) *Attorney, Agent, or Firm* — Dinsmore & Shohl LLP; Weston R. Gould

(57) ABSTRACT

Additive fabrication methods for 3D composite objects having preform fiber reinforcements embedded in a matrix material include providing local heat and mechanical energy to at least partially melt, impregnate and solidify the matrix material forming at least one reinforced composite layer of the object. Successive layers are added in accordance to a computer generated tool path to form a three dimensional object with useful features.

5 Claims, 30 Drawing Sheets

(51) Int. Cl.
- *B29C 70/54* (2006.01)
- *C22C 47/06* (2006.01)
- *B33Y 10/00* (2015.01)
- *B29C 64/153* (2017.01)
- *B29C 64/314* (2017.01)
- *B29B 15/12* (2006.01)
- *C22C 47/14* (2006.01)
- *B22F 12/00* (2021.01)
- *B29B 11/16* (2006.01)
- *B33Y 80/00* (2015.01)
- *B22F 7/04* (2006.01)
- *B22F 10/10* (2021.01)
- *B33Y 30/00* (2015.01)
- *B33Y 40/00* (2020.01)
- *B33Y 70/00* (2020.01)

(52) U.S. Cl.
CPC .......... *B29C 64/153* (2017.08); *B29C 64/314* (2017.08); *B29C 70/30* (2013.01); *B29C 70/54* (2013.01); *B33Y 10/00* (2014.12); *C22C 47/06* (2013.01); *C22C 47/14* (2013.01); *B22F 10/10* (2021.01); *B22F 2007/045* (2013.01); *B22F 2998/10* (2013.01); *B22F 2999/00* (2013.01); *B33Y 30/00* (2014.12); *B33Y 40/00* (2014.12); *B33Y 70/00* (2014.12); *B33Y 80/00* (2014.12); *Y02P 10/25* (2015.11)

(56) References Cited

U.S. PATENT DOCUMENTS

| | | | |
|---|---|---|---|
| 4,204,011 A * | 5/1980 | Tanabe | B29B 15/105 |
| | | | 118/57 |
| 4,769,195 A | 9/1988 | Ishikawa et al. | |
| 5,026,463 A | 6/1991 | Dinter et al. | |
| 10,632,695 B2 * | 4/2020 | Zacharias | B29C 70/504 |
| 2006/0233966 A1 | 10/2006 | Marduel | |
| 2010/0173549 A1 | 8/2010 | Bonin | |
| 2015/0283614 A1 * | 10/2015 | Wu | B22F 3/12 |
| | | | 419/42 |
| 2015/0343747 A1 | 12/2015 | Meermann et al. | |
| 2016/0228909 A1 | 8/2016 | Marduel | |
| 2017/0368718 A1 | 12/2017 | Marduel | |

* cited by examiner

ADDITIVE FABRICATION METHODS AND DEVICES FOR MANUFACTURE OF OBJECTS HAVING PREFORM REINFORCEMENTS

CROSS REFERENCE TO RELATED APPLICATIONS

This application depends from and claims priority to U.S. Provisional Application No. 62/331,713 filed May 4, 2016, the entire contents of which are incorporated herein by reference.

TECHNICAL FIELD

The description relates to additive fabrication methods for objects having preform fiber reinforcements embedded in a matrix material.

BACKGROUND

Fiber reinforced composites, including carbon, graphite, diamond, glass, ceramics and metal fibers embedded in a variety of matrix materials, are attracting significant interest because of their superior properties such as light weight, mechanical properties and/or thermal conductivity (TC), low coefficient of thermal expansion (CTE) and high temperature properties etc. Many promising metallic matrix materials with carbon and graphite reinforcements for applications in areas such as aerospace, thermal management, and automobile have emerged.

However, metal matrix/fiber reinforced composite manufacturing faces many challenges that need to be solved to promote wider applications for these composites. The main issues with composite manufacturing include: (i) wettability between metal and fiber materials is poor (Guan et al.); (ii) at high temperature, fiber materials will react with metal to form a brittle intermetallic compounds, which strongly diminishes the properties of the composites (Pippel et al.); and (iii) the properties of many fiber reinforced materials are anisotropic and inhomogeneous due to the nature of distribution of the fibers (Lee et al.).

One way to achieve uniform and predetermined fiber distribution design is to utilize preforms to fabricate composites. The main techniques currently employed for fabrication of preform fiber reinforced metal matrix composites include liquid metallurgy processing, diffusion bonding and powder metallurgy processing.

For example, U.S. Pat. No. 5,495,979 teaches a metal infiltration technique to fabricate carbon fiber reinforced metal matrix composites. Also, U.S. Pat. No. 8,043,703 B2 discloses a liquid metal infiltration method into discontinuous graphite preforms to fabricate composite heat sinks.

Alternatively, European Patent application #EP 1820870 A1 discloses a method for making carbon fiber and metal matrix composites by adhering carbon fibers on a sheet or foil metal support to form a preform; stacking the preforms to form a preform laminate; and then heating and pressure welding the preform laminate in a vacuum or non-oxidizing atmosphere to unite the preforms.

U.S. Pat. No. 5,518,383 teaches creating metallized fibers by processing the fibers in a CVD furnace. The metallized fibers are then bonded to a metal surface by diffusion welding. US Patent application publication #20120037602 A1 discloses a method of applying heat and pressure to consolidate a metal coated fiber preform and diffusion bond the metal on the fiber preform to other metal components to form a unitary composite article. Further, U.S. Pat. No. 8,448,837 B2 teaches a method for manufacturing a metal part having a reinforcing insert of composite material by forming a blank of the part and superimposing layers of metal wire and layers of coated fiber and applying a hot isostatic pressing treatment to the blank.

U.S. Pat. No. 8,501,048 B2 teaches a production method for a metal-graphite composite material by sintering the precursor mixture with uniaxial pressing.

When the desired composite part becomes complex and large as well as the fiber volume fraction increases, many of the issues mentioned above such as effectively infiltrating the liquid through large distances and the prolonged exposure to hot metal leading to unwanted interfacial brittle material formation become quite challenging. Similarly, sintering by hot pressing also becomes challenging due to the difficulty in maintaining uniform pressure and heating profile across large preforms. Further, the associated hardware becomes expensive as well as inflexible because separate molds/setups are required for each part, as opposed to freeform fabrication.

Therefore, freeform fabrication methodologies that can additively manufacture components utilizing preform reinforcement layers would provide tremendous advantage to manufacture complex object without requiring huge infiltration or compaction systems.

To this end, Canadian Patent application #CA 2368680 A1 provided a method for creating a carbon fabric to metal connection by placing the carbon material onto a metal substrate and then laser joining the carbon material and metal substrate utilizing metallic powder filler material.

Further, US Patent Application Publication #20150375340 A1 disclosed an additive manufacturing method for fabricating a fiber reinforced composite objects by deploying a first layer of powder material, then disposing a fiber material adjacent to the first layer of powder material and applying laser energy to the first layer of powder material to fuse them into the fiber material, thereby, forming a reinforced metal matrix composite layer. Subsequent layers are added to form a 3D object.

SUMMARY

Fiber preform characteristics, such as the fiber density, weave pattern and thickness etc., are critical factors that determine the eventual properties of a composite material. To achieve an effective reinforcement, the preform must have dense weaving patterns (fiber fraction ranging 30-80%) and appreciable preform thickness (~mm) to facilitate mechanical handling as well as minimize property anisotropy.

Generally the wettability between molten metal and fiber materials is poor. In other words, molten metal naturally avoids impregnating into a fiber preform. This resistance increases as the preform weave density and thickness increase. Increasing the temperature of the liquid metal may facilitate the impregnation process, however, interfacial reaction and unwanted byproduct formation deteriorates the properties of the resulting composite. Particularly, when localized heating as commonly applied in additive fabrication processes becomes intense, it can cause fractures in the fibers and also onsets high localized convection in the matrix material causing preform destruction. Although surface treatment of fibers to improve wettability and reduce interfacial reaction have been utilized in some applications, the process adds significant cost to fabricate the preforms and is often undesirable when the matrix composition is critical, such as in many aerospace applications. Therefore, liquid metal infiltration as taught by Canadian Patent application #CA 2368680 A1 and US Patent Application Publication #20150375340 A1, especially through densely weaved preforms encounters serious challenges. This has been demonstrated in a recent study by Gibson et al. (Gibson et al. (2016), Hybrid Joining Through Additive Manufacturing, Challenges in Mechanics of Time Dependent Materials, Volume 2, B. Antoun (ed.), pp. 91 to 99), in which interlayer discontinuity and fiber inhomogeneity were unavoidable.

Further, it is also desirable that an additive fabrication device has the ability to monitor the impregnation process such that any discontinuity within the layer as well as between the layers can be examined during the fabrication process and be corrected to avoid costly part rejection in the end. Such in-situ sensing capability will be highly beneficial for industrial process control.

Yet further, for additive manufacturing, something needs to hold layers in place and keep the base support out of the way. After the part is fabricated, one must remove these supports. Easily removable supports are critical for fabricating complex shapes with overhang features. For example, FDM (Fused Deposition Modeling) technology widely used for additive manufacturing of plastic parts uses a support material that dissolves when placed in a bath of chemicals.

Alternatively, the powder-based technologies, like SLS (Selective Laser Sintering) use the surrounding powder itself to hold the object in place. After fabrication, one can lift the object from the powder bed and simply pour the excess powder back. However, aligning the fiber preforms on the powder bed is quite cumbersome and limits the shape complexity that can be achieved. In general, a metallic support material that can be dissolved away, preferably in water would be very beneficial to additive manufacturing processes employing high energy sources such as laser, electron beam or plasma.

Accordingly, an object of the present disclosure is to provide methodologies to promote localized impregnation of liquid material into densely woven preforms at low process temperature as well as limiting the contact time between the fiber and the liquid material, thereby reducing the potential for unwanted interfacial compound formation.

Methodologies as provided herein include disposing a fiber preform on a target platform, applying an electrical voltage through a pair of electrodes to heat up the fiber preform and optionally utilizing ultrasonic energy across a region of interest on the preform, disposing a layer of powder material onto the said region of the interest, impregnating the powder matrix material into the fiber preform, thereby forming a reinforced composite layer.

The applied electrical voltage causes resistive heating across a conductive preform, whereas a plasma heating is achieved across a nonconductive preform. The generated heat from the applied electrical voltage may be sufficient to impregnate the powder material into the fiber preform or alternatively, an optional additional directed energy beam such as a laser, electron beam or a plasma beam may be utilized to provide additional heat energy and promote infiltration and impregnation.

Further, the optional applied ultrasonic energy/waves assists in the impregnation process of the matrix material into the voids of the preform, overcoming the resistance imposed by material non-wettability.

In another aspect, a preform reinforced composite object fabricated by adding successive layers of composite is disclosed. The object includes a plurality of fused composite layers fabricated in accordance to a computer generated tool path with useful features.

Further, another object is to provide in situ monitoring methodology for impregnation process and flaw detection during fabrication processes. The methodology may include acquiring the reflective and refractive signals of the applied ultrasonic waves and applying data analytics techniques to monitor and control the impregnation process. Accordingly, the ultrasonic transducers used to facilitate the impregnation process are also used for diagnostics purposes to provide inline process control capabilities.

Yet further, another object is to provide a water dissolvable metallic support material system for additive fabrication of complex 3D objects. Accordingly, an Al—Sn—Zn material design and its application methodology is provided.

In yet another aspect, a fabrication system for manufacturing preform reinforced composite objects is provided. The fabrication system includes one or more of a buildup stage, a preform delivery system, a fabrication head, numerically controlled motion system, a directed energy beam generation system and other ancillary componentry. The fabrication head further includes a pair of electrically coupled electrodes/rolls, a pair of ultrasonic transducers, a powder delivery system, directed energy beam delivery system, and a compaction/preform cutting roll.

The above and other objects, features and advantages of the present disclosure will become more fully understood from the detailed description given herein below and the accompanying drawings which are given by way of illustration only, and thus are not to be considered as limiting.

BRIEF DESCRIPTION OF THE DRAWINGS

Exemplary aspects will become more fully understood from the detailed description and the accompanying drawings, wherein.

DETAILED DESCRIPTION

Figure 1A:
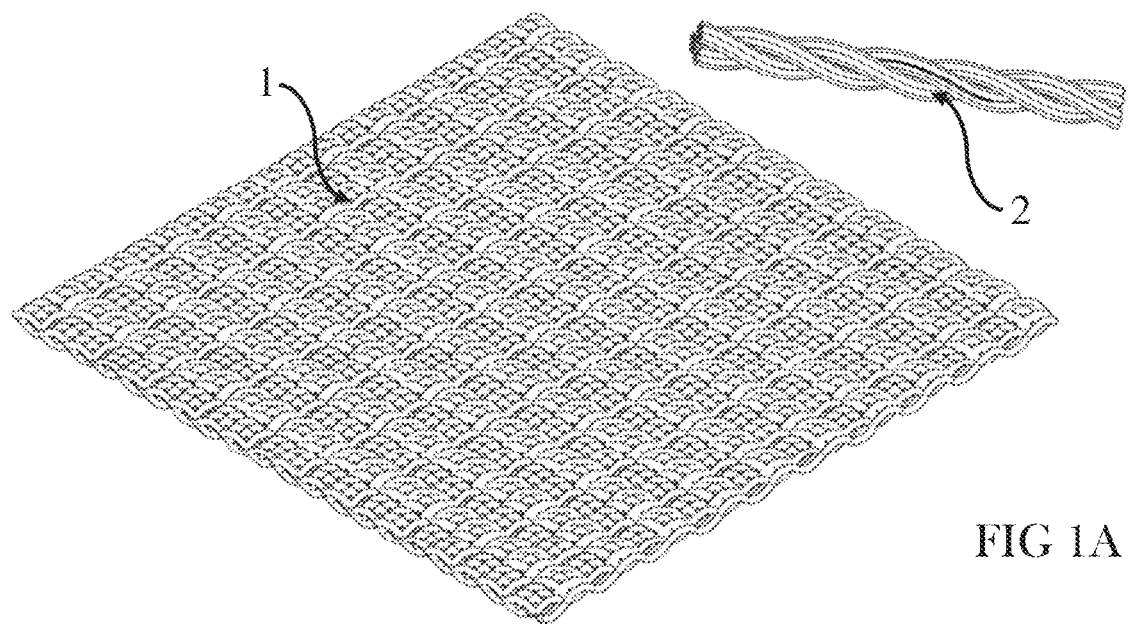
FIG. 1A is an exemplary view of woven preform layer having braided fiber bundles.

Various modes for carrying out the present invention are disclosed herein; however, it is to be understood that the disclosed modes are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Reference will now be made in detail to compositions, aspects and methods of the present disclosure. It is also to be understood that this disclosure is not limited to the specific aspects and methods described herein, as specific components and/or conditions may, of course, vary. Furthermore, the terminology used herein is used only for the purpose of describing particular aspects of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components unless explicitly noted otherwise.

Throughout this description, where publications are referenced, the disclosures of these publications in their entireties are hereby incorporated by reference to more fully describe the state of the art to which this disclosure pertains.

The following terms or phrases used herein have the exemplary meanings listed below in connection with at least one embodiment:

"Preform" as used herein means an object that has been subject to preliminary, usually incomplete shaping or molding before undergoing complete or final processing. More specifically here, a reinforcement phase intended for making a composite material.

"Composite" as used herein means a thing made up of several parts or elements. Specifically here, an object having an embedded phase and a matrix phase intended to provide functionalities that are not otherwise provided by the individual elements alone.

"Reinforcement" as used herein means a material phase intended to provide superior thermal, mechanical or electrical properties. Reinforcement is optionally a carbonaceous material, polymeric material, glassy or ceramic material or a metallic material.

"Matrix" as used herein means the continuous phase in a composite or two-phase alloy microstructure in which a second phase is dispersed. A matrix is optionally a carbonaceous material, polymeric material, glassy or ceramic material or a metallic material.

"Wettable", as used herein, means having a strong affinity for a liquid phase determined by contact angles close to zero degrees. Wettable materials with a strong affinity for liquid, maximize contact with the liquid and have smaller contact angles with the liquid.

"Non-wettable", as used herein, means lacking affinity for liquid. Materials that are non-wettable naturally repel the liquid, causing droplets to form, and have large contact angles close to 180 degrees with the liquid.

"Interfacial Compound" as used herein, means a material formed by chemical reactions between the reinforcement phase and the matrix phase.

"Capillary" as used herein, pertains to phenomena occurring in a narrow space (e.g. 1000 micrometers or less) or as if in a tube or fine channel of similar dimension.

"Directed Energy" as used herein, means an energy flux that can be directed towards a given direction via a manipulating mechanism such as optics, magnets or gases. Lasers, electron beams, plasma jets, combustion jet, or infrared (IR) energy emitters, are some examples.

Figure 1B:
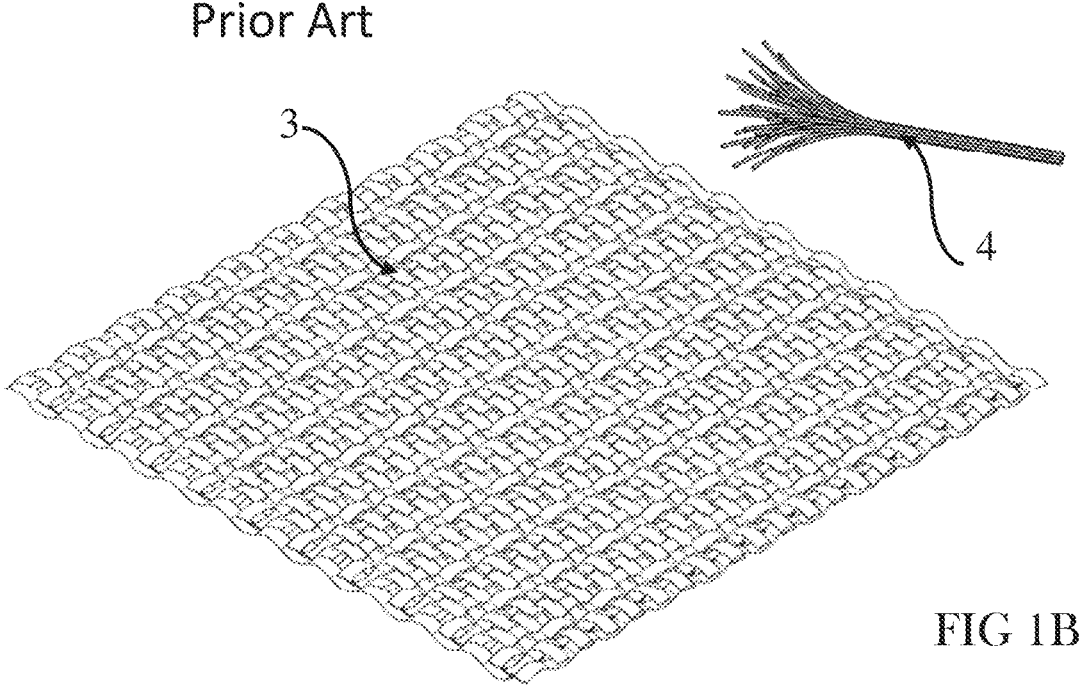
FIG. 1B is an exemplary view of woven preform layer having unbraided fiber bundles.
Figure 3:
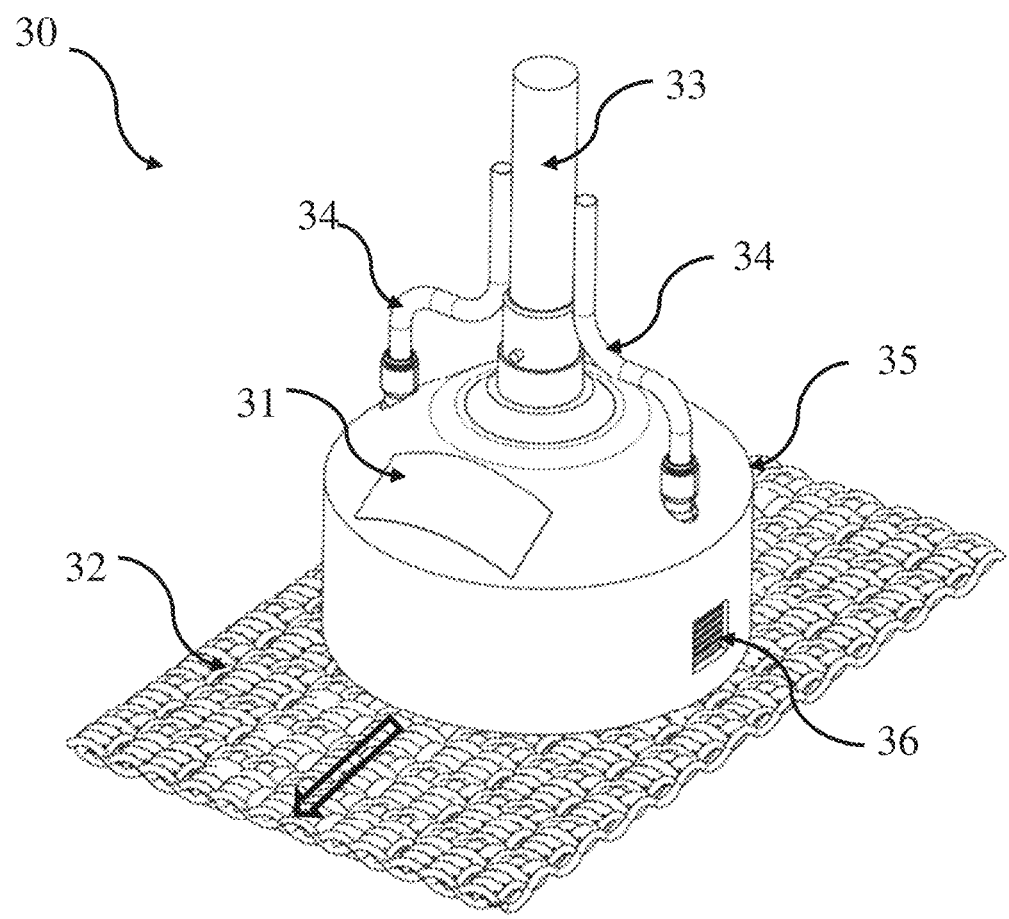
FIG. 3 is a perspective view of a layered preform reinforced composite manufacturing device according to the teachings of the current disclosure (exemplary aspect)

As a way of background, woven preforms of aramid, glass or carbon fibers have long been favorites for fabricating reinforced composites for aerospace, automotive, military as well as sports applications. Referring to FIGS. 1A and 1B, common woven preforms (fabrics) contain fibers oriented on at least two axes, in order to provide great all-around strength and stiffness. A sheet of woven fabric once embedded into a matrix material and consolidated (solidified or cured) can take flexural and tensile loads on multiple axes, and even exhibits good stiffness properties off axis. With reference to FIG. 1A, 1 represents a common approach to make a sheet of woven fabric, where a bundle of fibers is braided into a rope 2 form and then weaved into a sheet. Referring to FIG. 1B, 3 represents another approach to make a sheet of woven fabric, where the fiber bundle 4 is not braided but weaved into a sheet form. Although, weaving the fibers into three dimensional preforms is possible and have been used in many applications, the process is very complex and expensive. Therefore, often the woven sheets are used to form a three dimensional framework and then consolidated into a three dimensional object. Particularly, when the matrix material is a resin, the woven sheets can be impregnated with the resin prior to forming and curing into a 3D structure.

As will be appreciated, when the desired matrix material includes or is a metal, then the 3D preform may be fabricated first and then the matrix material impregnated into it either by liquid metallurgy or solid state bonding within a controlled enclosure. These approaches face many technological challenges such as wettability issue, capillary resistance, unwanted interfacial reactions, expensive and inflexible infrastructures etc., to name a few. Therefore, freeform fabrication methodologies that can additively manufacture composite objects utilizing woven fabric preforms would provide tremendous advantage to manufacture complex object without requiring complex infiltration or compaction systems. However, it is contemplated that the matrix of various aspects may be formed from other materials, including but not limited to ceramic or polymer materials. Accordingly, as used herein, the term "powder material" may refer to polymer resins, pellets, ceramic forming materials, metals, or the like.

Figure 2A:
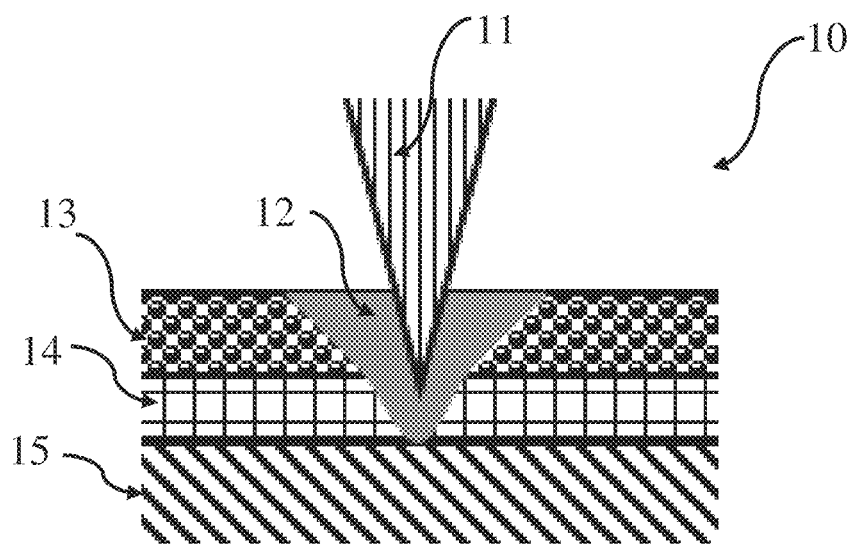
FIG. 2A is a schematic description of joining a fiber preform to a solid substrate by depositing powder materials on one side of the preform and melting the powder by an energy beam.

Canadian Patent application #CA 2368680 A1 provided a method for creating a carbon fabric to metal connection by placing the carbon material onto a metal substrate and then laser joining the carbon material and metal substrate utilizing metallic powder filler material. Now referring to FIG. 2A, 10 (Prior art), comprises of a metallic substrate 15, a fiber preform 14, a laser beam 11 projected on a powder layer 13 to form a liquid pool 12. For a void free connection, the liquid pool 12 must infiltrate through the fiber preform 14 to reach substrate 15 and fuse with it, as well as fill the empty space present in the preform.

Figure 2B:
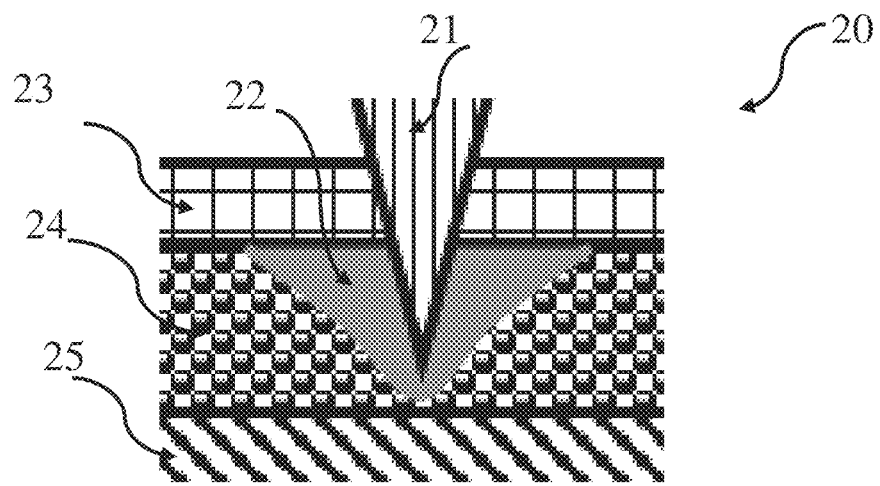
FIG. 2B is a schematic description of infiltrating liquid material into a fiber preform by depositing powder materials on both sides of the preform and melting the powder by a laser beam.

Further, US Patent Application Publication #20150375340 A1 disclosed an additive manufacturing method for fabricating a fiber reinforced composite object by disposing a first layer of powder material, then disposing a fiber material adjacent to the first layer of powder material and applying laser energy to the powder material to fuse them into the fiber material, thereby, forming a reinforced metal matrix composite layer. Subsequent layers are added to form a 3D object. Now referring to FIG. 2B, 20 (Prior art) comprises of a target 25, a powder layer 24, a preform layer 23 and laser beam 21 passing through preform 23 to form a liquid pool 22. For achieving a void free composite layer, liquid pool 22 must infiltrate the fiber preform 23 against gravity as well as surface tension and capillary resistance posed by the preform, particularly when the fiber density is high.

When the preform fiber weave density is high (Inter fiber bundle gap ~1 mm) and also the thickness is moderate (~1 mm), liquid material infiltration through the preform is extremely difficult due to inherent poor wettability between many liquid materials, specifically metals and useful fibers such as carbon, graphite and ceramic. Further attention is drawn to the nature of gaps present within the preforms. The gaps present between the fiber bundles forming the weave are typically large and can be in the order of mm and would pose moderate resistance to liquid infiltration, although for uniform strengthening the weave gap should be minimized as much as possible. But, the gaps between the fibers inside a bundle are extremely small and pose large capillary resistance particularly when the wettability is poor. It must be noted that, for effective load transfer or heat dissipation between the fiber and the matrix, infiltrating inter fiber gaps is quite critical. To some extent, this can be achieved by coating the surface of the fibers or by increasing the temperature of the liquid material to high levels which brings additional challenges such as cost and unwanted interfacial compound formation etc.

Further, the use of a laser beam to achieve intense local heating as taught in the above prior art brings additional challenges. For example, during fabrication of a SiC(fiber)-Al(matrix) composite, an interfacial reaction can be described according to the equation:

$$4Al(L)+3SiC(S)=Al_4C_3(S)+3Si.$$

$Al_4C_3(S)$ is a brittle intermetallic compound as well as acts as an interfacial thermal barrier and reacts with atmospheric moisture to degrade the properties of the composite further during service. The growth of the interfacial compound typically follows an Arrhenius relationship where, the thickness, $d=k\cdot\sqrt{t}$. The rate constant k is related to the temperature according to the equation:

$$\ln(k) = -\frac{Q}{RT} + C$$

where, R is the gas constant, Q is the activation energy and C is a constant. Both Q and C depend on the material system. As noticed here, the intermetallic thickness has a square root dependence on the time, whereas an exponential dependence on the temperature. In other words, an increase in the impregnation time is less detrimental than an increase in the liquid metal temperature. Further, due to high surface area afforded by the thin fibers, the interfacial reaction can further be enhanced and thereby increasing the constant, C. Incidentally, in a laser beam assisted deposition process, typically, the interaction time is short (~0.1-10 s) but the local temperature of a small volume of material exposed to a laser beam can rise extremely rapidly and reaches a very high value. For example, in traditional carbon fiber preform infiltration techniques involving titanium alloy matrix, furnaces are required to achieve temperatures in the order of 2000° C. However, temperatures much higher than 3000° C. may appear at the small (~mm) interaction volume of a laser beam.

Additionally, sudden differential heating and cooling of the preform as experienced by intense energy beam can lead to fiber fracture. Yet further, the exposure to the laser beam may heat surface of the non-conductive fiber bundle, but internally, the fiber may be cold and when liquid metal enters inside the bundle, it may solidify prior to complete impregnation. In summary, the prior art can, at best, provide partial solution when the reinforcement density (fiber density) is low.

In view of the above-described limitations, provided are methods to promote localized impregnation of liquid material into densely weaved preforms at low process temperature as well as limiting the contact time between the fiber and the liquid material, thereby reducing the potential for unwanted interfacial compound formation. The necessary process temperature and impregnation time depends on several factors such as the melting temperature of the matrix material, the thickness of the preform, as well as the use of any auxiliary energy source such as a laser beam and ultrasonic waves. In the absence of any auxiliary energy source, the fiber preform should at least be heated to the melting point of the matrix material. In this case, the melting of the powder will be controlled by the heat transfer rate between the preform and the powder which is expected to be slow. Therefore, the preform should be preferably heated to temperatures between $T_m$ and $T_m+300°$ C., $T_m$ being the melting point of the matrix material. However, this is not a limiting condition for practicing the teachings of this disclosure. For example, impregnation can successfully be achieved by keeping the preform temperature below the $T_m$ and using an auxiliary energy source such as the laser to melt the powder. In a preferred embodiment, the temperature of the liquid metal should be kept between 20-100° C. above the melting point, $T_m$. As the contact time has a lesser impact on the interfacial compound and especially when the temperature of the liquid material is kept closer to the melting point, the preferred impregnation time is between 1 second to 100 seconds, which is substantially lesser than the conventional impregnation time (hour). A first exemplary aspect is explained hereinafter with reference to FIGS. 3 to 6.

Referring to FIG. 3, provides a device 30 arrangement for carrying out at least one method. The device 30 includes a powder delivery channel 31, an optional cover gas delivery channel 34, an optional enclosure 35 covering a region of the preform sheet 32, an optional delivery system 33 for an auxiliary energy beam, e.g., laser, and an optional gas release passage 36. For simplicity, the directed energy generation system and the associated componentry are not shown here. Further, powder reservoir as well as gas reservoir are also not shown. Additional gas supply, gas release, powder supply elements may be provided when desired.

Figure 4:
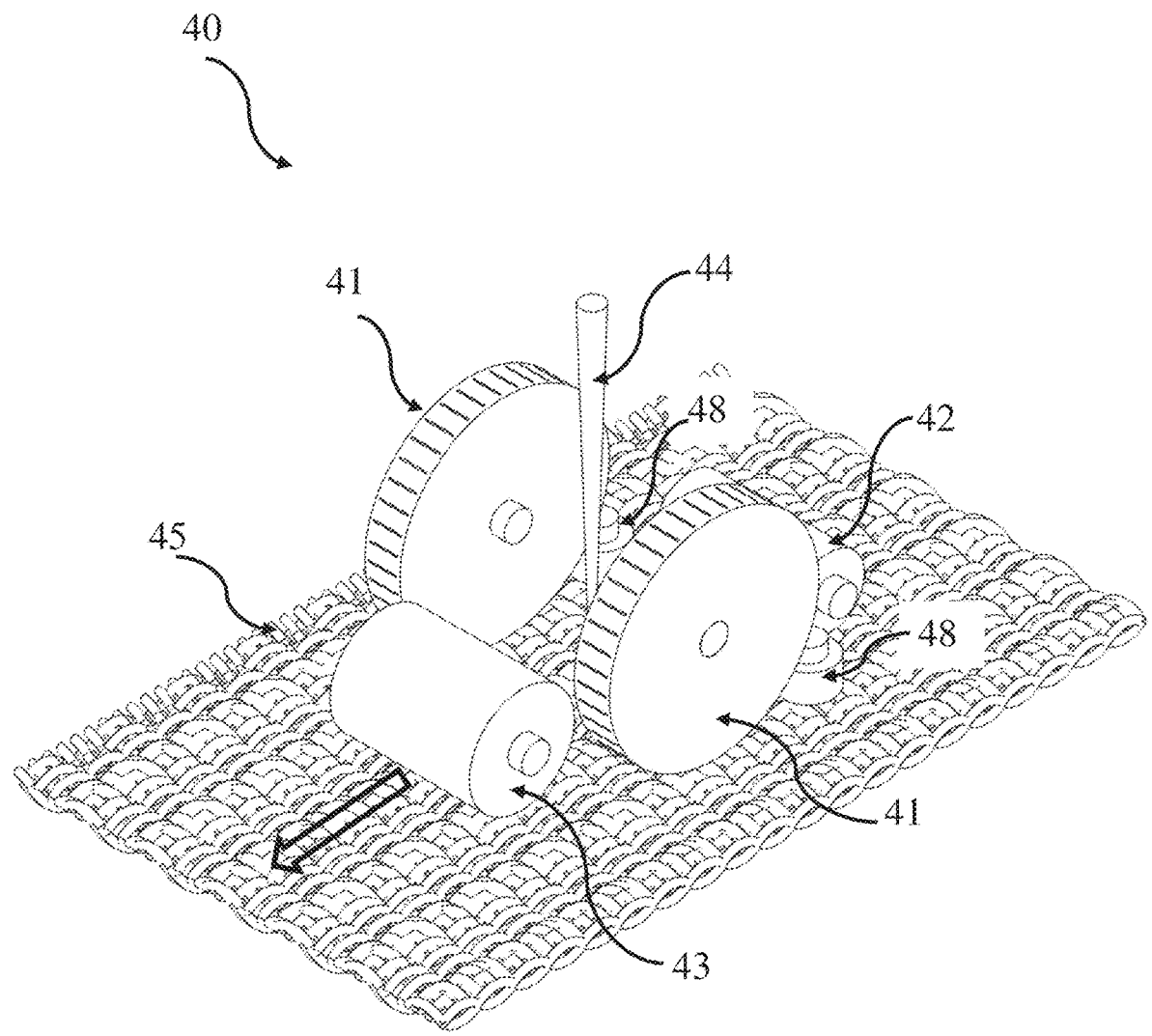
FIG. 4 is an exemplary perspective view of the arrangement of the heating rolls, ultrasonic transducers, the powder roll and the compress roll, according to the teachings of the current disclosure.

FIG. 4 is a prospective view depicting the positioning of different componentry of the device on the fiber preform inside an enclosure. An optional enclosure may be employed to provide protection such as in the form of a controlled process atmosphere. For example, an enclosure may be employed when the fiber preform is made from carbon fiber, which may ignite as a result of the voltage applied by the electrode rolls if the process atmosphere is not controlled. Moreover, an enclosure may be employed to prevent metals from oxidizing once they are melted from their powder form. In some aspects, the process may be carried out in a chamber with atmospheric controls when an enclosure is not included as part of the device. The electrode roll pair 41 applies a voltage across a selective region on the preform 45. The electrode rolls may be fabricated from a variety of metals such as steel, copper alloys, titanium and nickel. It is understood that the voltage amplitude and frequency would be adjustable to an appropriate combinations to achieve the desired effects based on the material and fabrication conditions. Depending upon the conductivity of the preform, different effects will be realized. For conductive preforms such as carbon or graphite, an applied voltage will generate heat in the preform by the principles of resistive heating. For this condition, the voltage is optionally direct current (DC) type, although the application of an alternative current (AC) voltage is contemplated in some embodiments. The heat generated in the preform 45 will depend upon many parameters, including but not limited to, the preform density, thickness, conductivity, applied voltage and the traverse speed of the rolls. For conductive fiber, the applied voltage is preferably maintained between 10 VDC to 500 VDC and current between 1 A to 100 A. As is evident from the direction of translation indicated by the arrow in FIG. 4, the powder roll 43 would have disposed a layer of metal powder onto the preform which will absorb heat from the preform 45. To prevent oxidation, in some aspects, the enclosure is fed with inert gas.

Alternatively, when the preform 45 is nonconductive, such as preforms of glass or ceramic, the applied voltage can be tuned to generate a surface plasma on the preform. The cover gas provided to the enclosure is optionally a plasma forming gas such as Ar, He and H which also provides a non-oxidizing environment. For plasma generation on non-conductive cloth the applied voltage across the electrodes 41 is preferably maintained between 1-10 kV in pulsed format (preferably between 5 kHz to 15 kHz) and the preferred current is between 0.01 A and 0.5 A. The surface plasma lends to two primary benefits: (a) it heats the preform; and (b) the plasma treatment improves wettability of many solid materials including glass, ceramics and plastics.

It is possible to generate sufficient heat in the preform, locally between the electrode pair 41 such that the disposed powder would melt by absorbing the heat generated in the space. However, for high melting point powders such as steel, nickel and titanium etc., it is expected to take long time to achieve the required temperature. Further, heating the preform to very high temperature may pose negative impact on the preform such as degradation and oxidation. To solve these issues, a directed energy beam 44 such as a laser or electron beam or a plasma beam may be projected on the metal powder to at least partially melt the metal particles deposed onto the preform. The energy beam is optionally a laser due to the ease of maneuverability within the enclosure. Optionally, the laser beam is delivered via a fiber optic system.

The dual heating system in accordance to the current teachings provides several benefits: (a) the preform is heated uniformly within the region of interest as opposed to sudden heating by a laser beam as taught by prior art; (b) the preform heating and the powder heating are decoupled giving wider range of control on impregnation and consolidation; (c) the thermal gradient in the preform as well as in consolidate composite can be managed to prevent fracture; and (d) preform surface treatment at individual fiber level enables impregnation into inter-fiber space without super heating the matrix material which prevents interfacial reactions and superior composite properties.

Referring to FIG. 4, the optional ultrasonic transducer(s) 48 coupled to the preform 45 provide wave energy and facilitate impregnation of the matrix material into the preform. Although two transducers 48 are shown, it is contemplated that a single transducer may be employed in some aspects, such as aspects that utilize ultrasonic waves for impregnation only. However, in other aspects, such as aspects in which ultrasonic waves are used for monitoring process completion, as will be discussed in greater detail below, two or more transducers may be employed. Two predominant types of waves, or wave modes, are generated within a material with ultrasonic waves: longitudinal and shear. Longitudinal waves (L-waves) compress and decompress the material in the direction of motion. Shear waves (S-waves) vibrate particles at right angles compared to the motion of the ultrasonic wave. The angle in which the ultrasonic wave enters the material determines whether longitudinal, shear, or both waves are produced. The deployment of ultrasonic transducers facilitate uniform distribution of the powder layer. Most importantly, when the material is molten the impregnation process is the greatly enhanced without requiring high liquid temperature which is often detrimental to the eventual properties of the composite. In other words, complete impregnation can be ensured by appropriate selection of ultrasonic frequency and amplitude as well as liquid material temperature without sacrificing the interfacial characteristics.

The optional compression roll 42 of FIG. 4, can further provide benefits such as: (a) squeeze any leftover material into the preform; and (b) flatten the consolidated composite layer for the addition of the successive layers when desired. Although the compression roll is not required, it is suitable for fabricating composite objects comprising of a single layer or a few layers, where layer surface finish is important.

Figure 5A:
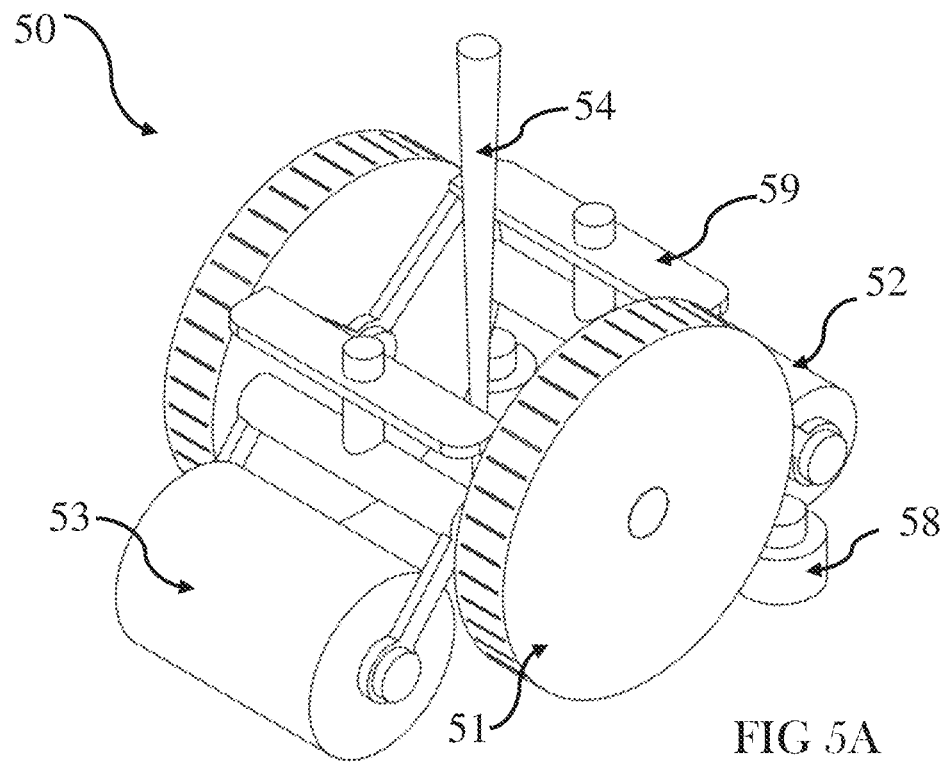
FIG. 5A is an exemplary perspective view showing the internal assembly of different components of a composite manufacturing device according to the teachings of the current disclosure.
Figure 5B:
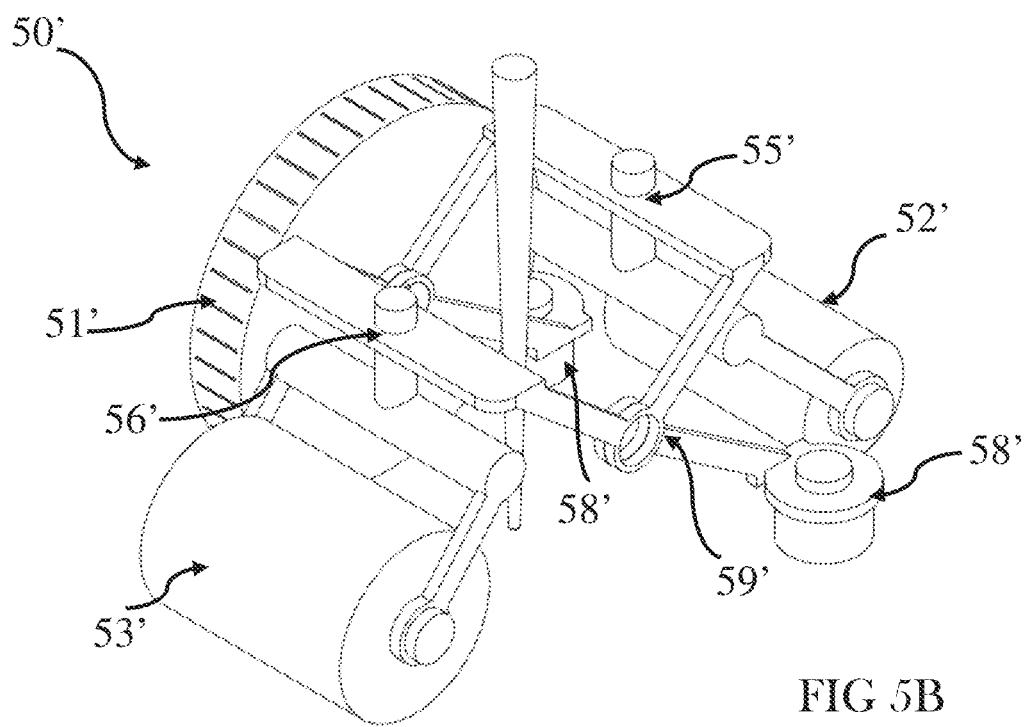
FIG. 5B is an exemplary perspective view of a composite manufacturing device, showing the assembly frame and relative location of the ultrasonic transducers according to the teachings of the current disclosure.

Further internal details of the device assembly are shown in FIGS. 5A and 5B. FIG. 5A shows the assembled internal view of the device 50 comprising a powder delivery roll 53, which is in communication with powder delivery channel (not shown here), optional directed energy beam 54. A mechanized roll 51, forms a part of the electrode pair, designated for applying a voltage across the target preform. Further details are presented in embodiment 50' which is the perspective view of the device 50 in the absence of one of the heating electrodes 51'. Embodiment 50' shows the assembly frame 59' which is in mechanical communication with the heating electrode 51', the powder roll 53', the ultrasonic transducers 57' and 58' as well as the press roll 52', which is flexibly coupled through joint 55'. Optionally, this can also act as a preform cutting roll with a cutting blade attachment (not shown). Since powder delivery roll 53' is designed to move around along a tool path to enable larger object fabrication, it is coupled through a flexible joint 56' to the frame 59' which enables an easy translation on the preform while performing their designated functions. As will be appreciated, intimate contact of the electrode rolls as well as the ultrasonic transducers with the preform are important for performing their designated functions.

Figure 6:
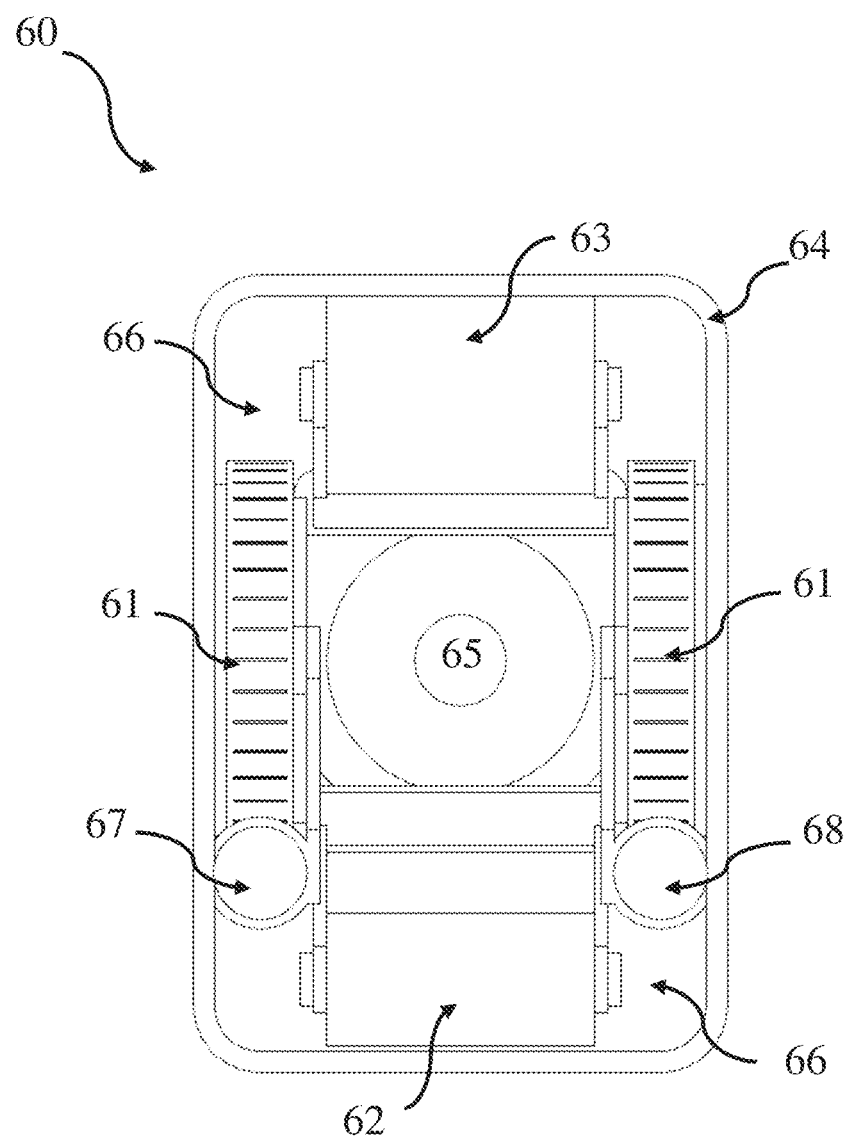
FIG. 6 is a view from the bottom of an exemplary composite manufacturing device, showing the arrangement of different components according to the teachings of the current disclosure.

Further attention is drawn to FIG. 6, which shows the bottom view of the device arrangement. As can be seen, the ultrasonic transducers 67 and 68 are positioned between the electrode rolls pair 61 and the optional press roll 62. This is to ensure that neither the applied voltage between the electrode pair 61 nor the applied load on the press roll 62 influence the ultrasonic wave transmission between the transducers 67 and 68 which is utilized for diagnostics and monitoring purpose. Both the transducers can be used to induce ultrasonic waves on the preform during impregnation and consolidation. Alternatively, one transducer can act as the transmitter of the ultrasonic wave and the other can act as the receiver. The later combination is useful for diagnostic purposes. It is to be noted that, the powder can be delivered to the active zone 65 in a variety of ways, the powder delivery roll 63 is designed to result in a uniform delivery. The optional enclosure 64 maintains a process atmosphere 66 around a localized fabrication area that includes the heated portion of the fiber preform. In some embodiments, the enclosure 64 maintains a cover gas atmosphere, and in some particular embodiments, an inert atmosphere, to prevent oxidation of the fibers as well as the matrix material.

Several factors are taken into account in designing and fabricating the deposition head 60. For example, the distance between the electrode pair 61 designated for powder heating is one parameter that determines the width of the impregnation zone in one scan of the deposition head 60. Smaller is the width of the impregnated track, easier it is to achieve finer feature resolutions in an additively manufactured object. Conversely, smaller track width also requires longer time to build an object. Further, most auxiliary energy beams 65 deliver power with a Gaussian profile having the maximum intensity at the center, although this can optionally be varied to certain extent. In general, it is easier to maintain a uniform power density with a smaller energy beam diameter. The diameter of the energy beam 65 may optionally be kept between 0.5 mm and 100 mm. The preferred range is between 5 mm and 50 mm. The energy beam delivery systems may be a commercially available laser, or electron beam or a plasma beam. Incidentally, keeping the track width smaller provides favorable heating profile for the preform by the heating electrodes. In an additive manufacturing method, it is desirable to keep the heat input contained with the layer as much as possible. Otherwise, the previous layers may be re-melted and re-solidified. Therefore, a smaller gap between the heating electrodes may ensure uniform temperature profile in the preform under treatment without over heating the previous layer.

Further, attention is drawn to the interaction of ultrasonic waves with the preform as well as the composite to be fabricated. In the preform, frequent and inefficient reflection may lead to rapid dissipation of energy due to dampening effects and destructive interference. Therefore, the loading factor (ratio of the surface area of the parts being treated to the volume of the active zone) may generally be lower. This necessitates higher watt density ($W/mm^3$) ultrasonic energy. Therefore, it is advantageous to keep the space between the rolls smaller to provide the necessary ultrasonic power with small transducers. Further discussion on the relationship between impregnation diagnostics and spacing between the transducers and in turn between the electrode pairs 61 is provided later in this disclosure.

Ensuring complete impregnation, or in other words, having the ability to monitor incomplete impregnation or voids within the consolidated layer would provide tremendous benefits for industrial implementations of the present devices and methods. However, real time process monitoring is a daunting task for additive manufacturing processes in general. Particularly, detecting internal defects in a given layer while it is being built is very difficult. Further, predicting an optimized process parameter for the next immediate layer in advance is virtually impossible. In a traditional fabrication technique such as injection molding, where the same object is manufactured over and over, typically, historical data is utilized in conjunction with in-line process monitoring sensors for quality assurance. For additive manufacturing however, the objects are most usually custom made and hence the geometry and the tool path change from one part to another part. Therefore, often historical data for a future build is not available, hence predictive process control is one of the critical challenges of additive manufacturing technologies in general.

An object of the present disclosure is that the ultrasonic transducers utilized for promoting impregnation according to the current teachings, can be utilized for real-time process monitoring. Ultrasonic waves are transmitted through air, liquid, and solids by high-frequency particle vibrations. The directed energy in an ultrasonic wave is reflected or change other physical parameters associated with the waves by boundaries between materials regardless of whether the material is gas, liquid, or solid. Ultrasonic waves are also reflected by any discontinuities or voids in solid materials. These reflected waves, which are caused by internal discontinuities, can be compared to a series of reference wave forms corresponding to a known part and or known discontinuities of various types at various places in depths, enabling the size and severity of internal defects to be identified.

When operating in pulse-echo mode, ultrasonic transducers act as both ultrasonic wave emitters and ultrasonic wave receivers. The reflected ultrasonic waves vibrate the piezoelectric crystal within the ultrasonic transducer and generate voltages that are measurable by data acquisition hardware. When operating in through-transmission mode, two ultrasonic transducers will be used; one transducer generates the wave (e.g., the transmitter) and the other receives the wave (e.g., the receiver). The frequency of the ultrasonic sensor is chosen based on several factors including detectable flaw size, depth of penetration, and grain size of the material. The higher the frequency, the smaller the flaws the system detects, but the depth of penetration decreases. Since the aim here is to provide localized impregnation and monitoring through successive preform layers or two adjacent tracks, higher frequencies are preferred. The preferred ultrasonic frequency is between 50 kHz and 300 kHz and the preferred ultrasonic power is between 0.1 W and 10 W.

Further, as the angle of the ultrasonic transducer with respect to the surface of the object under testing continues to increase, L-waves move closer to the surface. The angle at which the L-wave is parallel with the surface of the object under test is referred to as the first critical angle. This angle is useful for two reasons. Only one wave mode is echoed back to the transducer, making it easy to interpret the data. Also, this angle gives the test system the ability to look at surfaces that are not parallel to the reference surface, such as variations on the composite layer being consolidated.

Figure 7A:
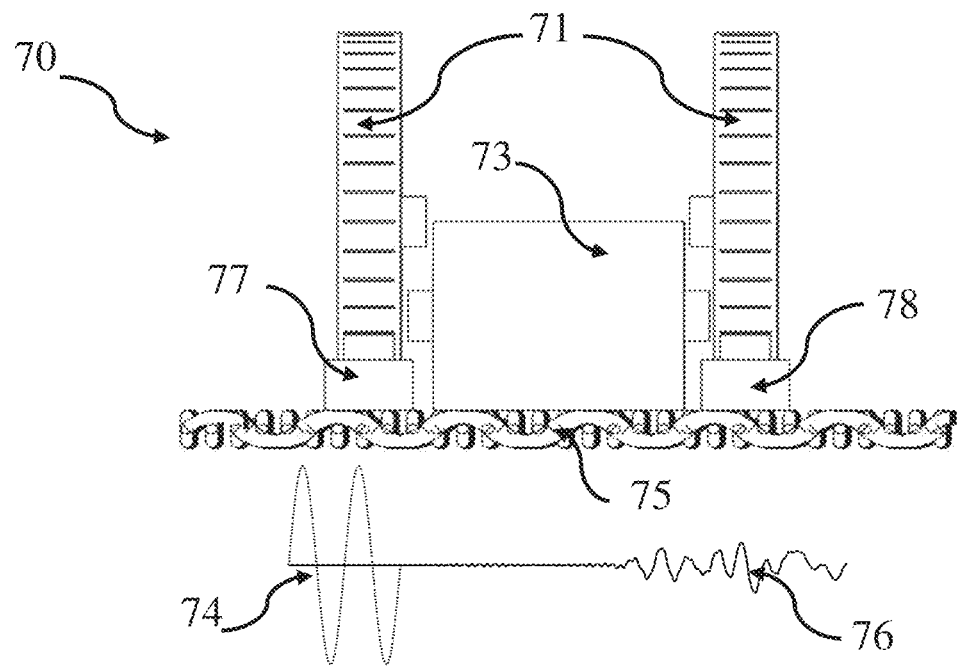
FIG. 7A is a rear view of an exemplary arrangement of the heating rolls and ultrasonic transducers on the preform layer, according to the teachings of the current disclosure.

Now, referring to FIG. 7A, the ultrasonic transducers 77 and 78 are positioned across the track width 75, outside the heating electrode pair 71. The transducers 77 and 78 can be used in various ways and forms; one being the emitter and the other being the receiver when through-transmission is desired, or both acting as transmitter as well as receiver operating in pulse-echo mode. The location of the transducers with respect to the electrode pair 71 varies depending upon the thickness of the preform, the weave density of the preform as well as the distance between the electrode pair.

Ultrasonic diagnostics is commonly used for inspection of engineering materials, however, this conventional analysis only indicates the presence of a defect or flaw in an otherwise contiguous material. The diagnostics methodology for additive manufacturing process as disclosed herein teaches novel approaches to carry out inspection on objects that are complex and the geometry and the internal structure of which change as the fabrication continues. Normally, for ultrasonic inspection on an object the external boundary serves as a reference surface against which any reflections or physical changes to the wave are compared to infer the presence of defects or discontinuities present inside the object. However, in additive manufacturing, the external boundary evolves as the fabrication progresses. Further complexities arise during fabrication of preform reinforced composites as taught in the current disclosure. Discontinuities exist within the fiber bundle as well as at the interlocks of the fabrics. As the powder is impregnated into the preform, the internal characteristics of the preform change rapidly. Further, the previously consolidated layer will also act as a discontinuity as the preform pattern may not exactly align from layer to layer.

According to the teachings of the current disclosure, the aforementioned challenges can be addressed by diagnostic protocols that generate a series of reference waveforms for known states of the object (e.g., part). Now, referring to FIG.

Figure 7B:
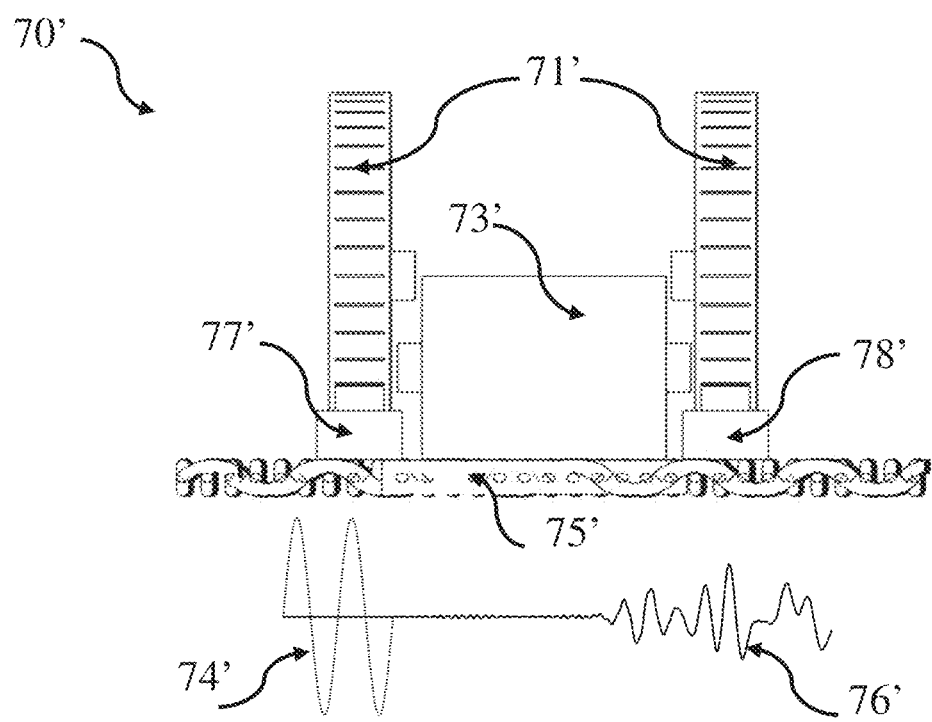
FIG. 7B is a rear view of an exemplary arrangement of the heating rolls and ultrasonic transducers on the impregnated preform layer, according to the teachings of the current disclosure.

7A, a reference waveform 76 for the preform is generated and stored in a computer. The reference waveform 76 here represents the reflections and physical changes to an induced ultrasonic wave 74 from the transducers 77 as recorded by the receiver 78 after transmission when no matrix material has been impregnated into the preform. It is to be noted that this reference waveform will vary from one preform to another depending on the preform characteristics. FIG. 7B shows the post consolidated state of the composite when complete impregnation of the matrix material into the preform has taken place. Now, a new reference waveform for 76' is generated which represents an exemplary complete impregnated state.

During fabrication process, the evolving waveforms can be compared to a reference waveform(s) to monitor the progress of the impregnation process and accordingly adjust the process parameters to ensure complete impregnation. More particularly according to some aspects, a first ultrasonic wave is introduced to a part, and a second ultrasonic wave emanating from the part is detected. The second ultrasonic wave is compared with a reference signal which is associated with a known part in a complete impregnated state. The presence of one or more flaws are determined based on the comparing of the second ultrasonic wave with the reference signal. For example, the presence of one or more flaws may be determined when the second ultrasonic wave does not match the reference signal.

Figure 8:
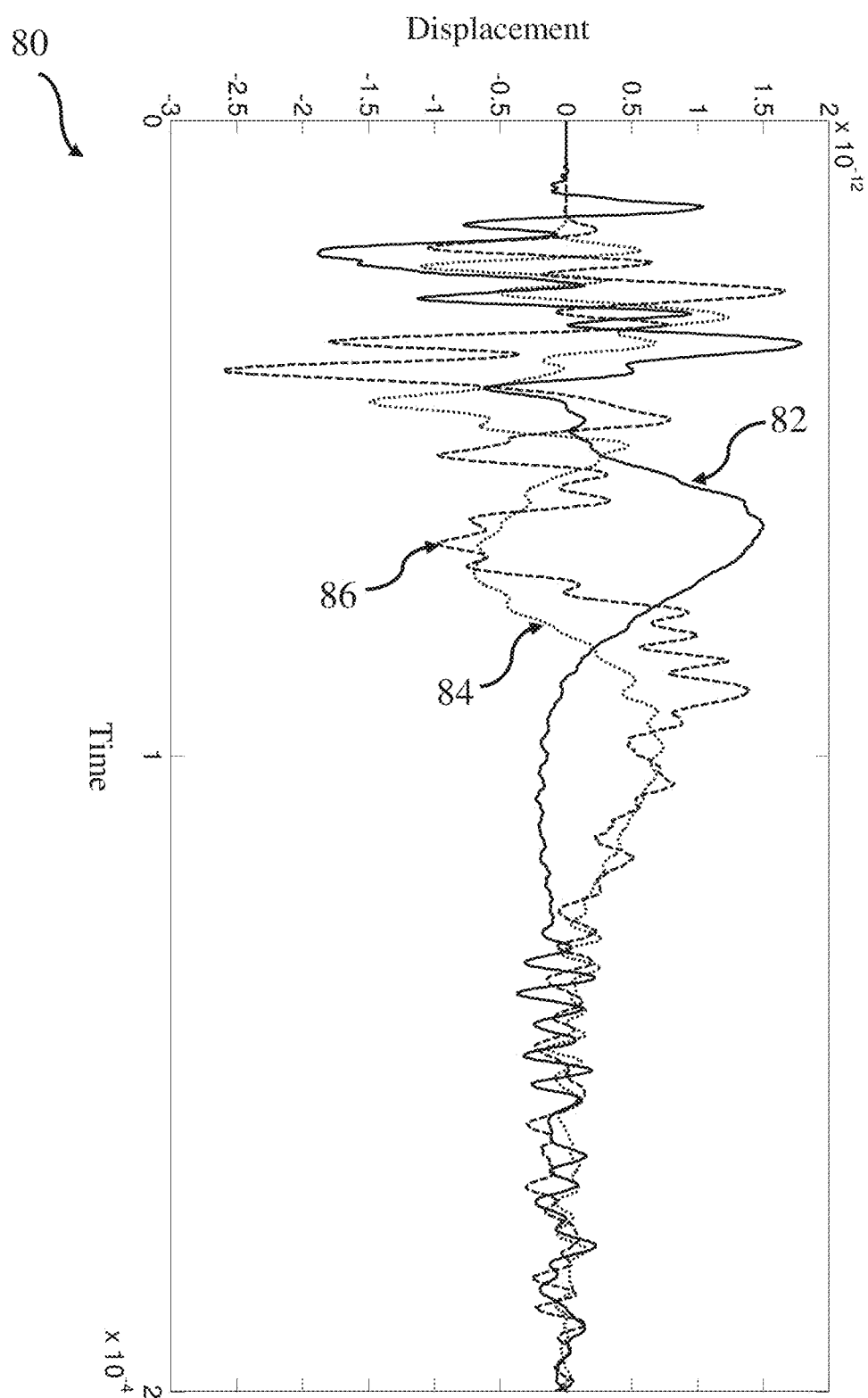
FIG. 8 is the recorded ultrasonic wave at the receiver through different preforms (i.e., as received, powder embedded, and liquid impregnated) having 1 millimeter (mm) inter bundle gap with an input signal of 0.1 mm displacement at 200 kHz frequency from a transmitter located at 2 centimeters (cm) distance.
Figure 9:
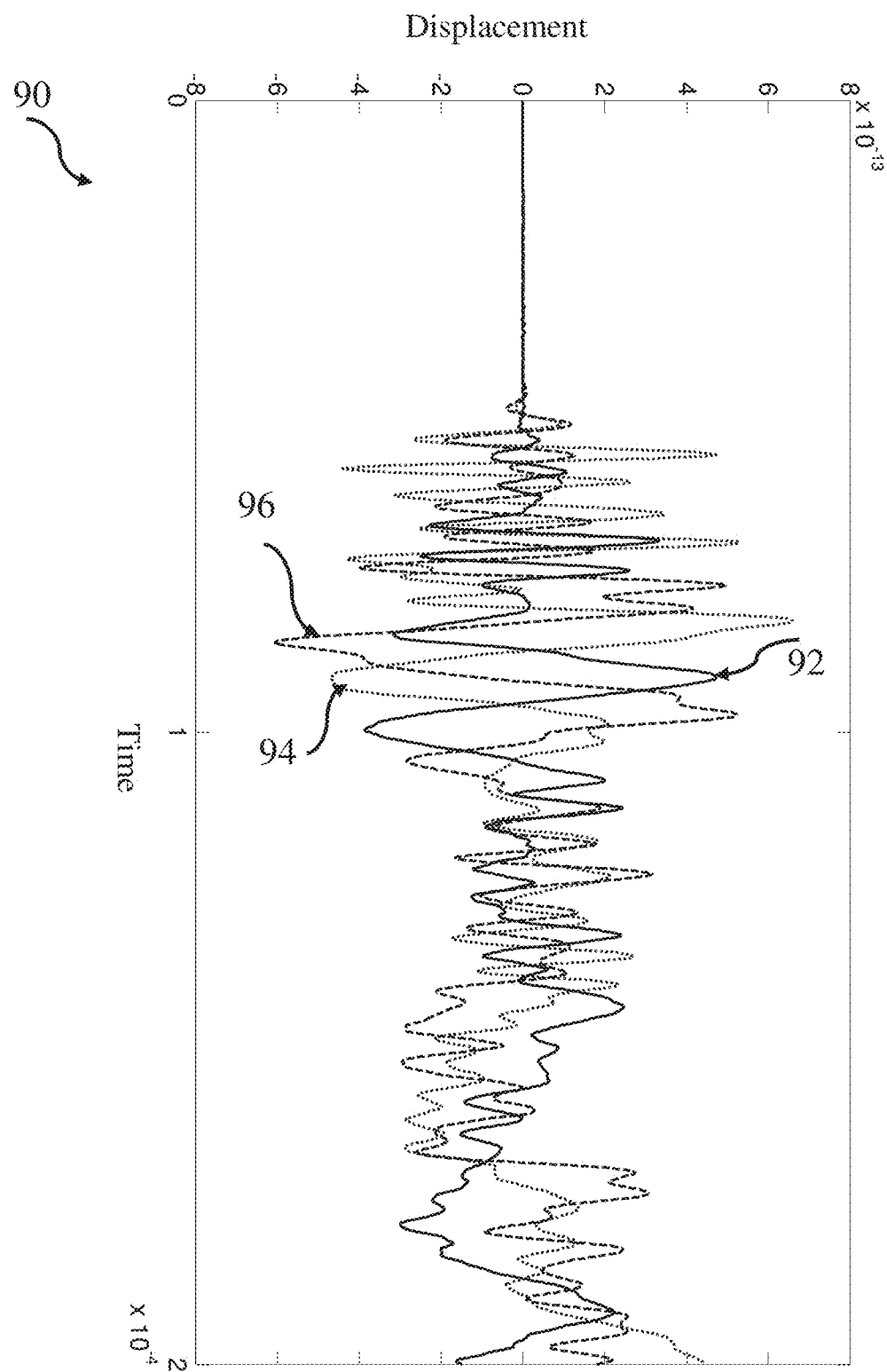
FIG. 9 is the recorded ultrasonic wave at the receiver through different preforms (i.e., as received, powder embedded, and liquid impregnated) having 1 mm inter bundle gap with an input signal of 0.1 mm displacement at 200 kHz frequency from a transmitter located at 6 cm distance.
Figure 10:
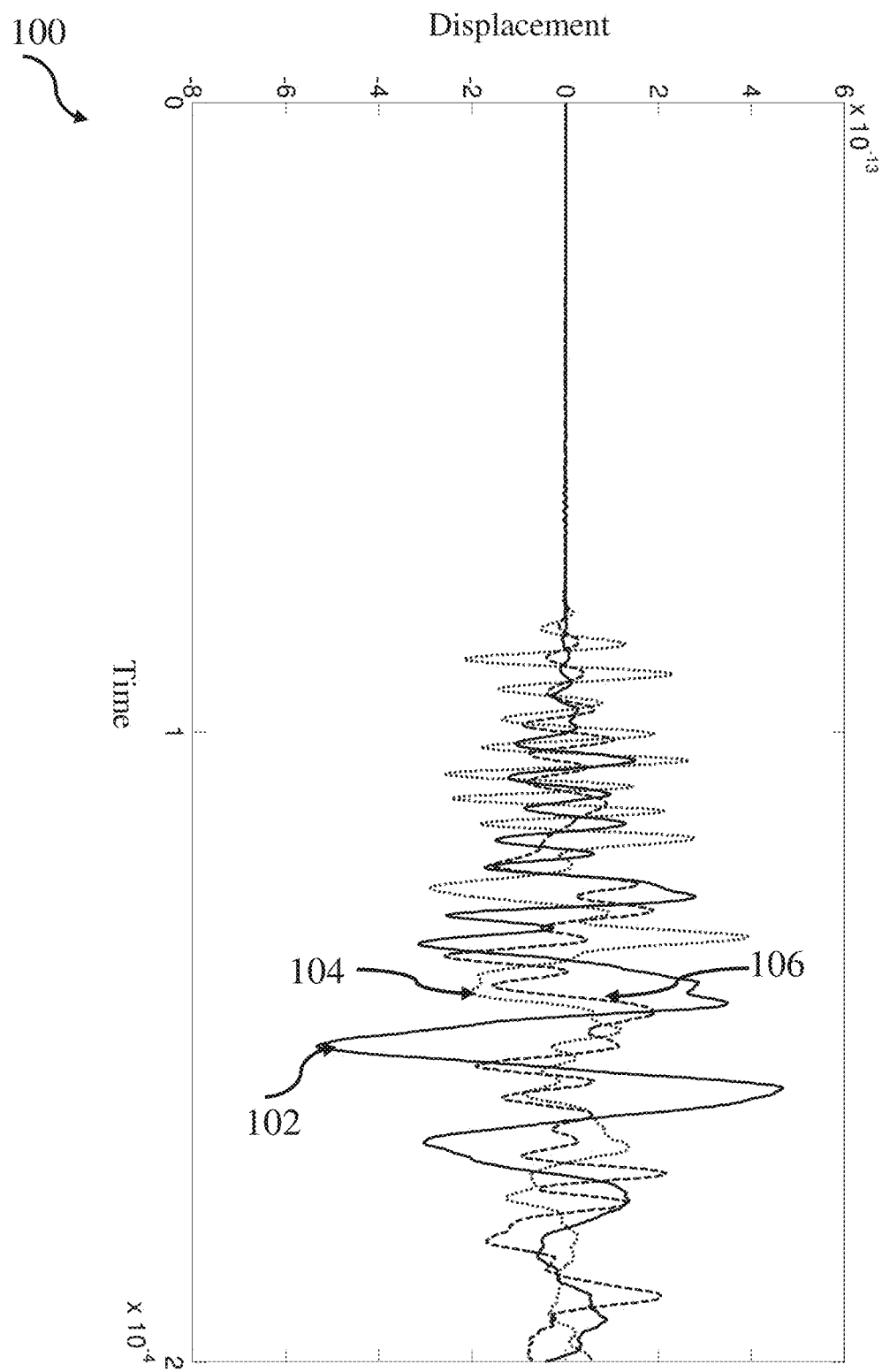
FIG. 10 is the recorded ultrasonic wave at the receiver through different preforms (i.e., as received, powder embedded, and liquid impregnated) having 1 mm inter bundle gap with an input signal of 0.1 mm displacement at 200 kHz frequency from a transmitter located at 10 cm distance.

Now referring to FIG. 8, the ultrasonic waves recorded by the receiver after transmitting through as received carbon fiber preform having 1 mm inter bundle gap 86, preform with embedded solid metal powder 84 and the liquid impregnated preform 82 are presented. Here the distance between the transmitter and receiver was kept at 2 cm and the input ultrasonic wave was at 200 kHz with 0.1 mm displacement. As can be seen the embedment of solid powder into the preform didn't significantly alter the transmission of the wave 84 compared to the wave 86 transmitted through the as received preform without powders. However, the transmitted waves 82 through the liquid impregnated preform has very distinct characteristics with phase shifts, which can be recorded and utilized for diagnostics purpose. The distance between the transmitter and the receiver is a critical parameter for diagnostics. When the distance between transmitter and receiver was changed to 6 cm, for the same parameter above (FIG. 8), as expected, there was a time lag as shown in FIG. 9. However the characteristics difference between as received preform and impregnated preform was still visible. Further time lag was observed when the distance between the transmitter and the receiver was changed to 10 cm, while retaining the distinction between porous state and impregnated state as shown in FIG. 10.

Figure 11:
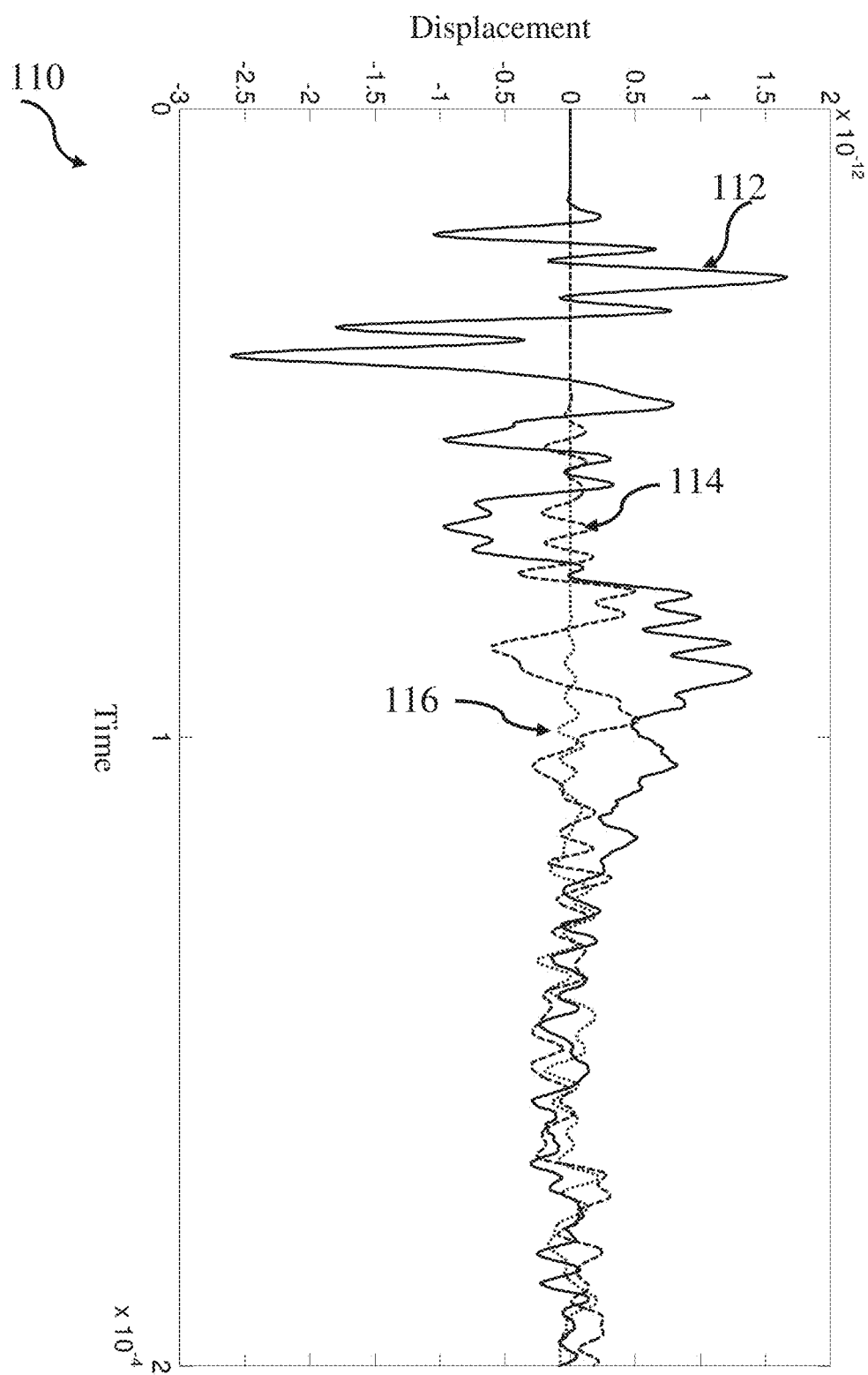
FIG. 11 is the recorded ultrasonic wave at the receiver through as received preform having 1 mm inter bundle gap with an input signal of 0.1 mm displacement at 200 kHz frequency from a transmitter located at 2 cm, 6 cm and 10 cm distance, respectively.
Figure 12:
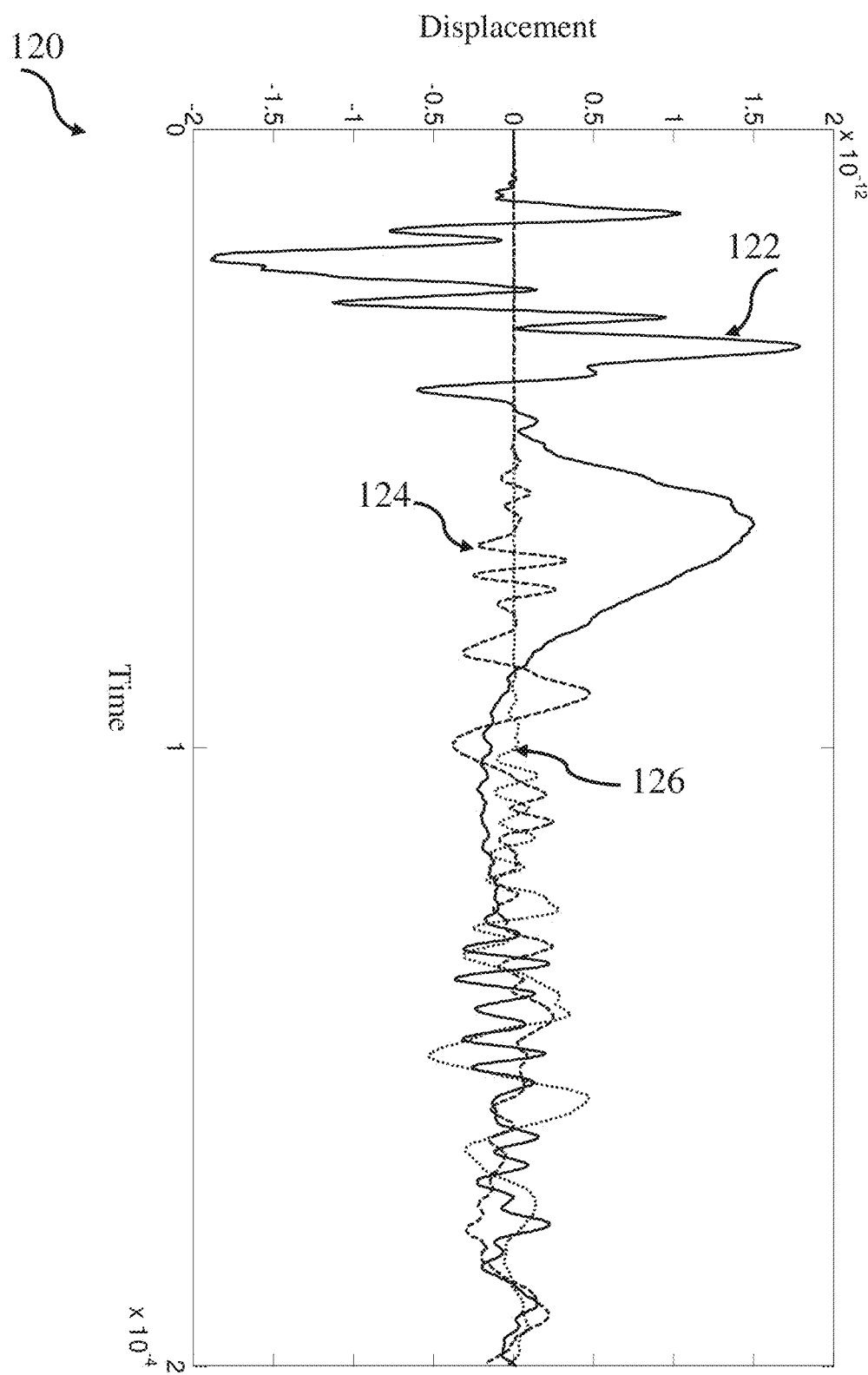
FIG. 12 is the recorded ultrasonic wave at the receiver through a liquid impregnated preform having 1 mm inter bundle gap with an input signal of 0.1 mm displacement at 200 kHz frequency from a transmitter located at 2 cm, 6 cm and 10 cm distance, respectively.
Figure 13:
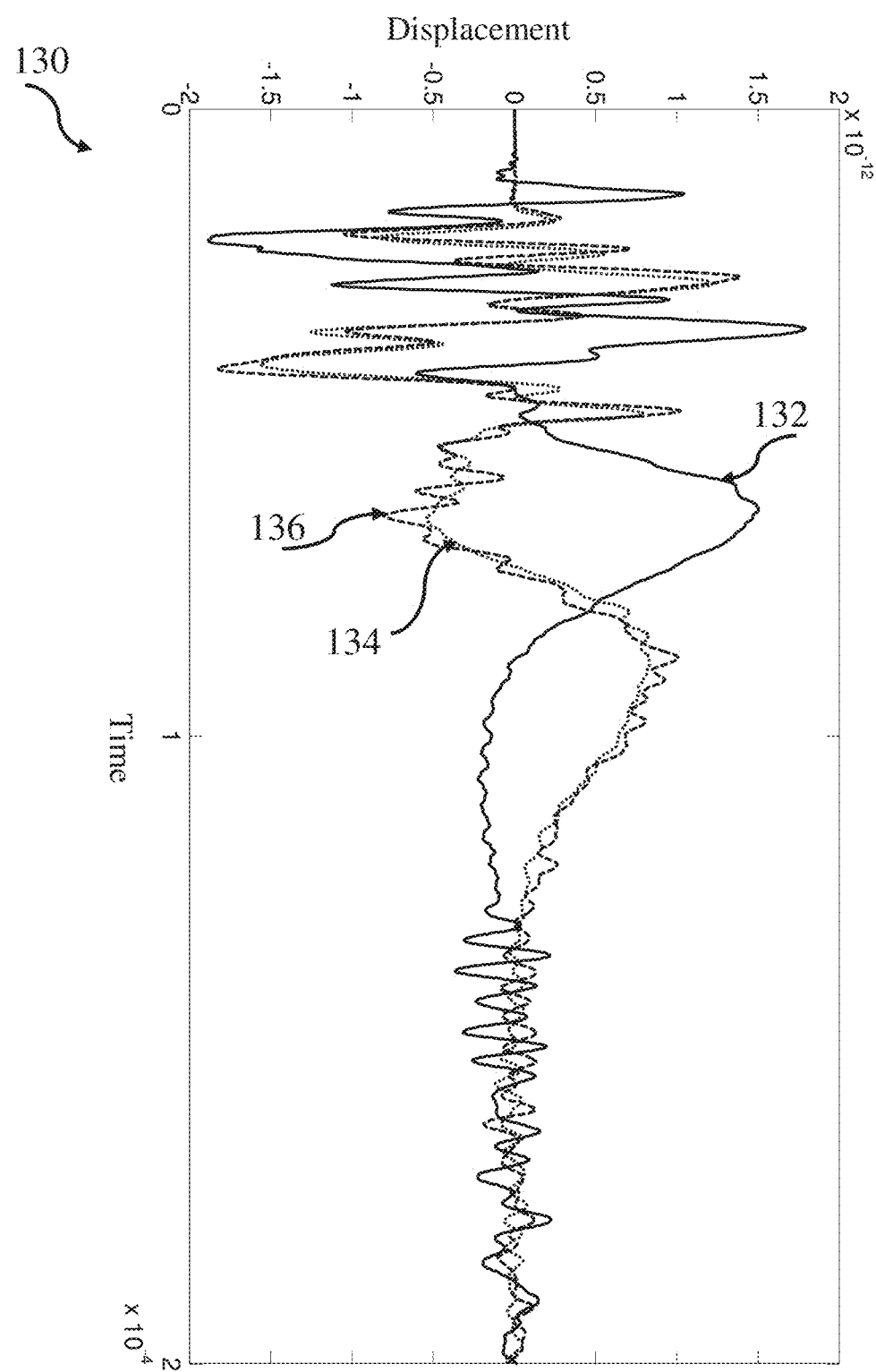
FIG. 13 is the recorded ultrasonic wave at the receiver through different preforms (i.e., as received, powder embedded, and liquid impregnated) having 2 mm inter bundle gap with an input signal of 0.1 mm displacement at 200 kHz frequency from a transmitter located at 2 cm distance.

Further, it can be seen from FIG. 11 and FIG. 12 that as the distance between the transducer and receiver increased from 2 cm to 10 cm, the amplitude of the transmitted wave decreased considerably for both porous preform and impregnated preform. Further, when the fiber inter bundle gap was changed to 2 mm, the transmission through the as received preform and powder filled preform became almost identical, however, the characteristics of the impregnated preform was distinctly different from them as shown in FIG. 13. It is conceivable that the signal strength can be enhanced by deploying very powerful transmitter and receiver, however, their implementation into the device will be complicated. The preferred transmitter-receiver gap may be between 1 mm to 20 cm with preferred ultrasonic frequencies between 50 kHz and 300 kHz and the preferred ultrasonic power between 0.1 W and 10 W. However, from experimental observations, the preferred gap appears to be, between 0.5 cm and 5 cm, where signals can be clearly distinguished.

Reliable diagnostics may require much more information processing than the simple explanation provided above. However, current computer systems and algorithms can perform this task in real time. Many such reference wave forms can be generated such as a reference waveform for a known amount of powder disposed on the preform prior to any fusion, reference waveforms at different temperatures, and reference waveforms for multilayer composites etc. These waveforms may optionally be stored in a database to be used for diagnostic purposes during the manufacturing process. These reference waveforms can be validated against theoretically predicted waveforms to develop predictive analytical tools to support the diagnostics process as well as process planning for next layers ensuring product quality. Further, enhancement can be provided to this diagnostics approach with artificial intelligence tools available in the industry. Although, the diagnostics approach of the current invention specifically addresses its usefulness for additive manufacturing of preform reinforced composites, it is envisioned that the approach can be used for additive manufacturing processes by generation the relevant reference waveforms or information.

Figure 14:
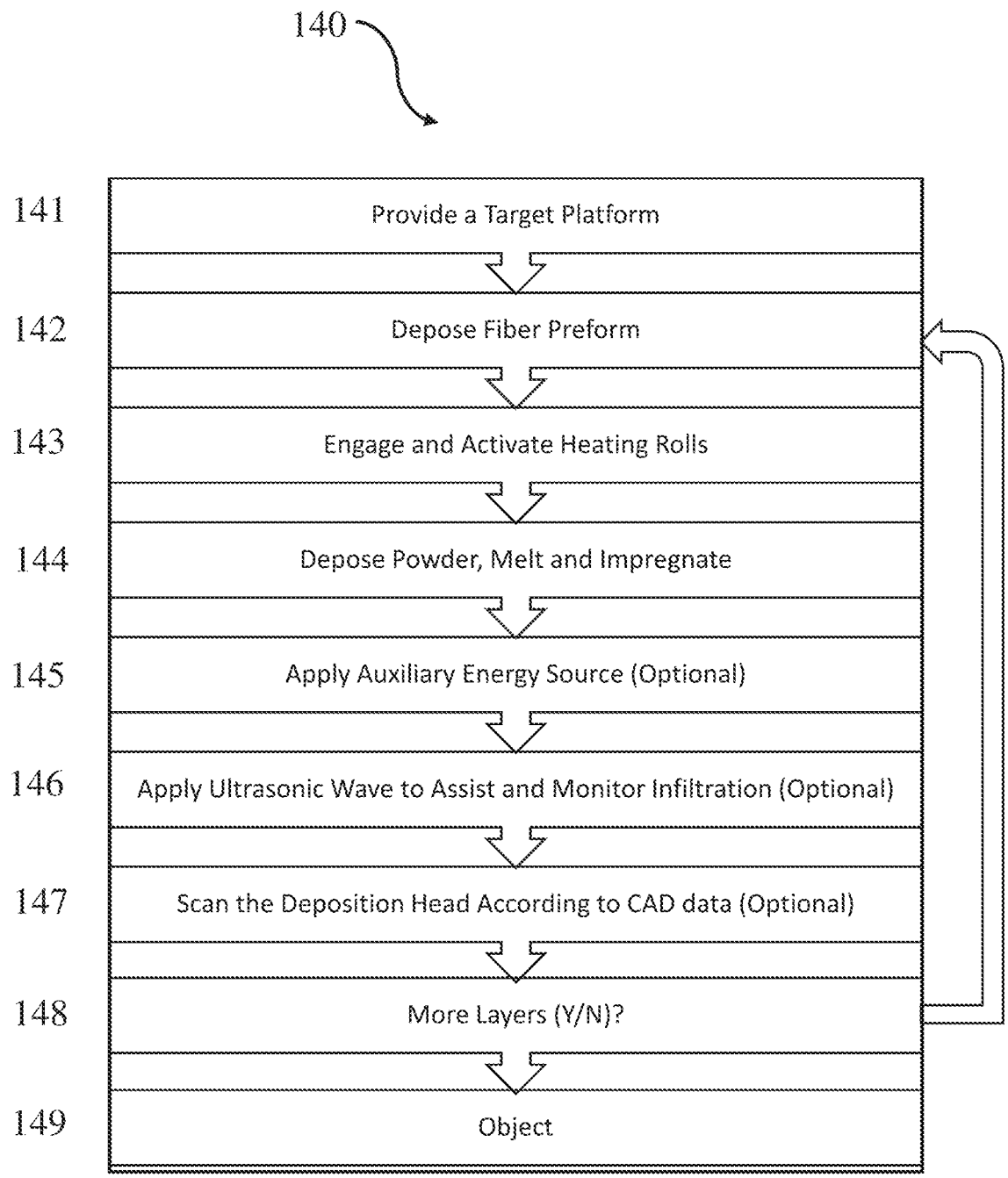
FIG. 14 is a schematic of an exemplary additive manufacturing method for objects having preform reinforcement according to the teachings of the current disclosure.

Thus far, much of the discussion has focused on the fabrication of a single layer preform reinforced composite. Referring to FIG. 14, method 140 provides an exemplary method for additive fabrication of preform reinforced composite object 149. Method 140 may include one or more of the following steps; providing a target platform in step 141 and disposing at least one preform layer onto the said platform in step 142. Step 142 can be achieved either manually by placing the preform in a desired manner or via an automated system that disposes the preform in accordance to a predetermined program. The latter approach may be used, for example, in industrial implementation.

In step 143, the electrode rolls engage the preforms and an appropriate electrical voltage is applied between the rolls. Depending upon the characteristics of the preform, the applied voltage will either effect resistive heating or a plasma heating in the fiber preform. The voltage parameters can be set with prior knowledge of the preform characteristics or can be determined by sensing the resistance between the rolls. Again, a variety of automation can be applied to step 143.

In step 144, a layer of powder is deposed onto the preform. There are many ways to deliver the powder onto the preform, optionally the powder roll 63 of 60 is utilized. This allows for controlled and uniform spreading of the powder onto the preform. Accordingly, step 144 may occur prior to step 143 and powder may be mechanically embed into the preform. Depending upon the temperature of the preform and the melting point of the powder, the powder may start impregnating the preform. For this to occur, the fiber must heat up to temperatures higher than the melting point of the powder, which can be achieved with the application of appropriate electrical voltage and current.

However, for higher melting point matrix materials, additional energy may optionally be provided onto the powder in step 145. Even if it is possible to melt and impregnate the powder by preheating the preform with the heating rolls, a separate energy source may be utilized to melt the matrix material for better process control, efficiency and preventing overheating of the preform which often deteriorates the preform characteristics resulting in poor composite properties. The energy source is optionally a laser, an electron beam, a plasma or even infrared source, while a laser beam may be used in some aspects due to the flexibility and simplicity afforded by it.

Further optional step 146, provides for assisting and monitoring of the impregnation process. Upon activation of the ultrasonic transducers, the applied ultrasonic energy helps in the distribution of the deposed unmelted powder. As the powders melt, the ultrasonic energy further aids in overcoming the capillary resistance of the fiber bundles and facilitates the impregnation of molten/semi-molten material into the cloth. In this step, the reference waveform for diagnostics purposes can be generated and stored into the database prior to deposing the powder. It is possible that this data may be available in the database from prior runs. As mentioned earlier, the ultrasonic parameters can be varied to achieve the dual goal of impregnation and diagnostics.

Once the impregnation is satisfactory with respect to a reference waveform, the deposition head moves forward according to CAD data or tool path generated by the control system in step 147. It is noted that step 143, 144 and 147 may overlap. Further, step 146 can be practiced without the diagnostics based on prior knowledge and experience, however, diagnostics may be engaged to ensure satisfactory quality.

Method 140 further provides for a logic gate to determine the need for additional layers in step 148. If an additional layer is required, steps 142-148 are repeated with or without the optional steps. If the desired layers have been fabricated, method 140 concludes in step 149 and the object is removed. The steps in method 140 are not necessarily always discrete. In fact, that there are some overlaps between some steps leading to a continuous fabrication process. Further, there may be at least some omissions in certain steps. For example, for some layers, only steps 143-148 are repeated. Alternatively, for some layers, steps 142-148 are repeated without deposing additional powder.

Figure 15:
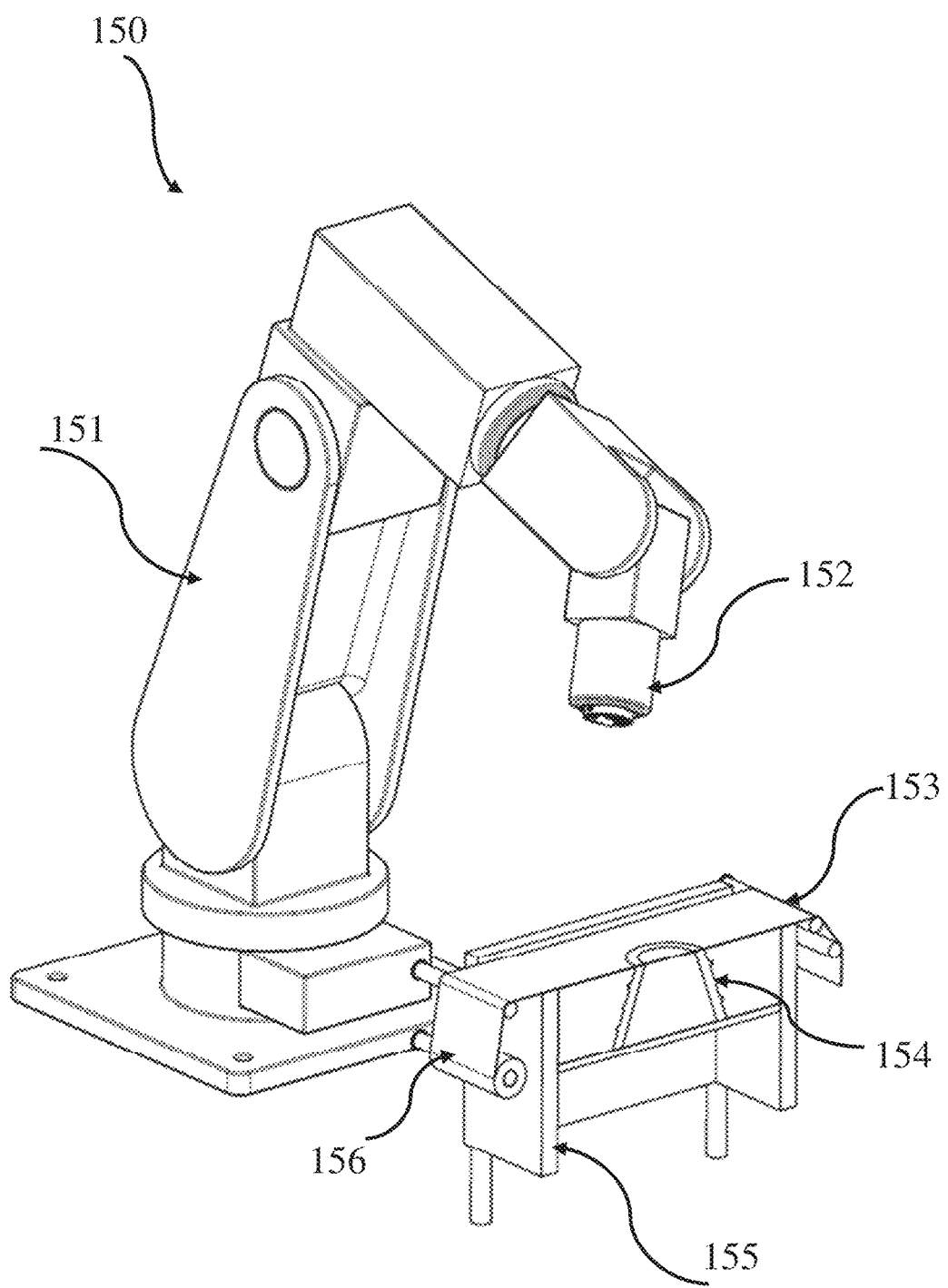
FIG. 15 is a schematic exemplary additive manufacturing system for objects having preform reinforcement according to the teachings of the current disclosure.

Referring to FIG. 15, an exemplary additive manufacturing system 150 operating according to the teachings of the present disclosure is illustrated. The manufacturing system 150 comprises of the fabrication device of the present disclosure 152 operably connected to a robot 151. Further, it comprises a target platform 155 operably connected to a preform delivery mechanism 153 and 156 on which the desired object 154 is fabricated. The ancillary componentry such as the power supply, control systems, laser, powder hopper and gas tanks are not shown and their inclusion in the system is understood. The manufacturing system 150 can be configured in a variety of ways. For example, a CNC motion system can be utilized instead of a robot. Further, another robot can be deployed to deliver the preforms. The entire system can be enclosed in a controlled environmental chamber.

Figure 16:
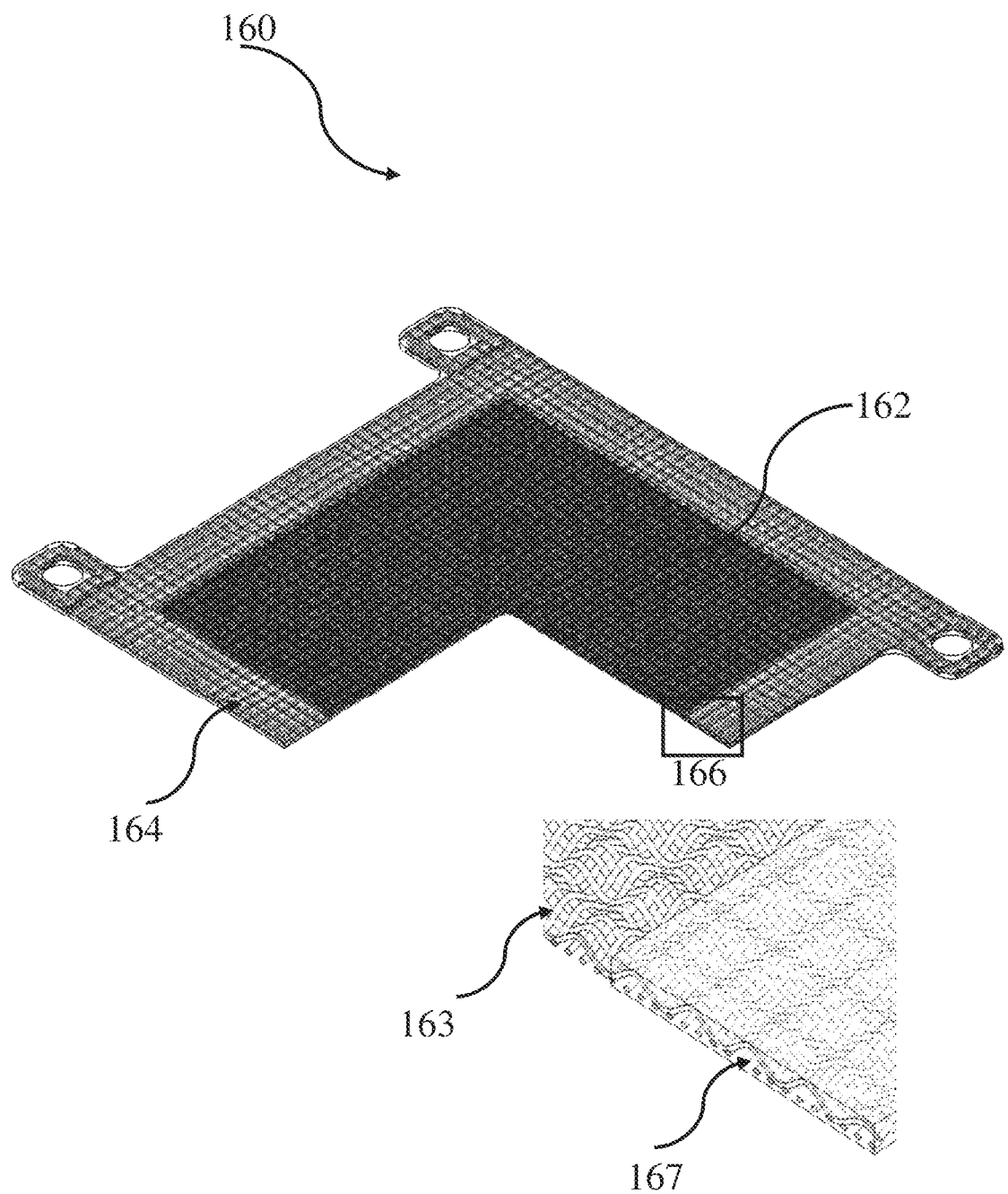
FIG. 16 is a schematic of an exemplary electrode for an electrochemical process having conductive porous preform region and composite boundary for mechanical fastening, fabricated according to the teachings of the current disclosure.
Figure 17:
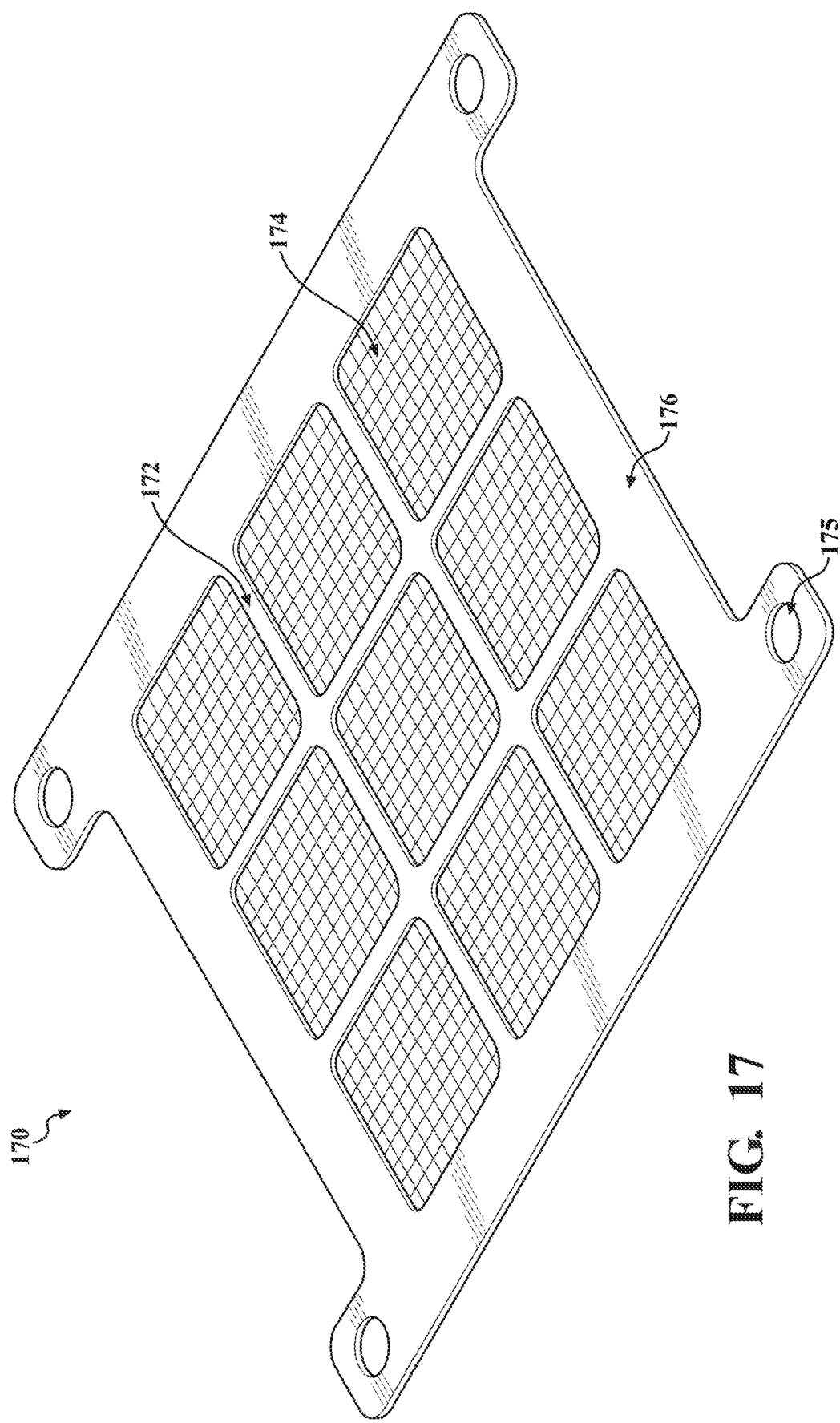
FIG. 17 is a schematic of an exemplary electrode for an electrochemical process having conductive porous preform region and composite boundary as well as internal ribs for mechanical fastening, fabricated according to the teachings of the current disclosure.

FIG. 16 illustrates a flow through electrode for electrochemical applications such as capacitive deionization, electrolysis and energy storage. The component 160 comprises of a carbon fabric region 162 with a reinforced metallic composite frame providing mechanical strength, corrosion resistance as well as electrical conductivity. Although carbon fabrics are excellent materials for many electrochemical applications, fabricating an electrochemical device with them is challenging due to lack of mechanical strength in the fabric. Often, carbon fabrics are sandwiched between conductive metallic plates to build such devices, however the conductivity between the fabric and the metal plate is poor requiring higher voltage and energy losses. Conductive pastes have been used in some applications, however, they add additional complexity and often introduce impurities to the system. Impregnation of corrosion resistant metals such as titanium into the selective region 167 to provide the framework for mechanical fastening as well as electrical connection can easily be achieved utilizing the teachings of the present invention. Beyond the boundary, rest of the fabric 163 is porous carbon which allows flow of electrolyte or chemicals ensuring efficient electrochemical processes. Referring to FIG. 17, large electrodes comprising of addition reinforcements 172 and flow through regions 174 can be fabricated according to the teachings of this disclosure.

Further, preform reinforced composite plate structure can be fabricated utilizing the teachings of this disclosure by simply opting to leave no flow through area 174 of FIG. 17. Such structures have many industrial applications such as electronic packaging where strength, effective heat dissipation as well as low coefficient of thermal expansion (CTE) are critically important. For example, copper has excellent thermal conductivity, however, its high CTE and low mechanical strength makes it unsuitable to be used for electronic packaging. Alloying can increase the strength and lower the CTE, but severely impacts the conductivity. Alternatively, Cu—C composite plates with carbon or graphite fiber preforms can be fabricated according to the method disclosed herein providing net-shaped components with fastening holes 175.

Figure 18A:
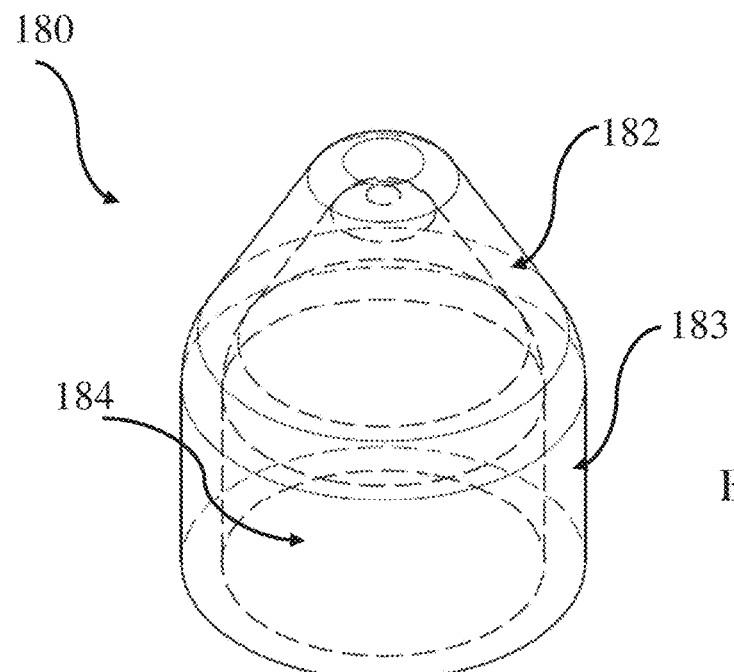
FIG. 18A is a schematic of an exemplary hollow composite structure utilizing dissolvable metallic support material, fabricated according to the teachings of the current disclosure.

FIG. 18A illustrates a component having preform reinforcement. The component 180 comprises of an overhang feature 182, a vertical wall 183 and a hollow internal profile 184. The vertical wall 183 can be built employing the additive manufacturing method 140 disclosed herein following a layer by layer consolidation profile along the vertical wall. Further, the unconsolidated preform can be cut to provide a hollow internal profile. However, building the overhang feature 182 is difficult without a support below it. Most plastic based additive manufacturing methods utilize a support material that can either be broken off or dissolved in a chemical. Such plastic material cannot be used for additive manufacturing of metallic component due to their low melting point. Powder bed based laser/electron beam sintering methods rely on the powder bed itself to provide the support to build such overhang and complex internal profiles. The method 140 disclosed herein may use a deposition head that is in contact with the preform, and hence unconsolidated powder wouldn't provide the necessary support and maintain the geometric accuracy. An object of the present invention is to provide a metallic composition that can act as the support material for overhang feature and at the same time can be removed simply by dissolving it by water. Accordingly, a ternary system of aluminum-tin-zinc (Al—Sn—Zn) material is provided.

When consolidated with a discrete microstructure, the material sets a spontaneous electrochemical reaction in the presence of water. The standard electromotive force (EMF) of Al, Zn and Sn are −1.662V, −0.763V and −0.136V, respectively. When an electrochemical cell is established between Al—Zn or Al—Sn, Al experiences an oxidation reaction. Similarly, in a galvanic couple of Zn—Sn, Zn experiences the oxidation reaction. However, for a spontaneous dissolution the oxidation product should be soluble or at least shouldn't form a stable scale, passivating the surface. It should be noted that a ternary alloy formed by complete melting and solidification of Al—Sn—Zn wouldn't undergo a spontaneous dissolution in water. On the other hand, a powder mixture of Al—Sn—Zn will not form galvanic couple due to lack of electrical contact. However, a rapidly solidified/fused material having discrete Al—Sn—Zn phases would form myriads of localized electrochemical cells leading to spontaneous dissolution of the structure. For rapid dissolution, an exemplary composition of the material is $Al_{50}Sn_{40}Zn_{10}$ with numbers representing atomic percent of each component, and the phases may be discrete and fine, which prevents passivation of aluminum leading to rapid spontaneous dissolution. Other compositions will cause electrochemical reactions, but the rates will be slower.

An exemplary method to fabricate the support is to make a fine mixture of 50% pure Al powder and 50% of $Sn_{80}Zn_{20}$ powder, partially fuse and then compact it forming a rapidly solidified support structure. Alternatively, fuse a pure aluminum wire along with an $Sn_{80}Zn_{20}$ wire by electrical arcing and atomize the molten material to deposit the support structure.

Figure 18B:
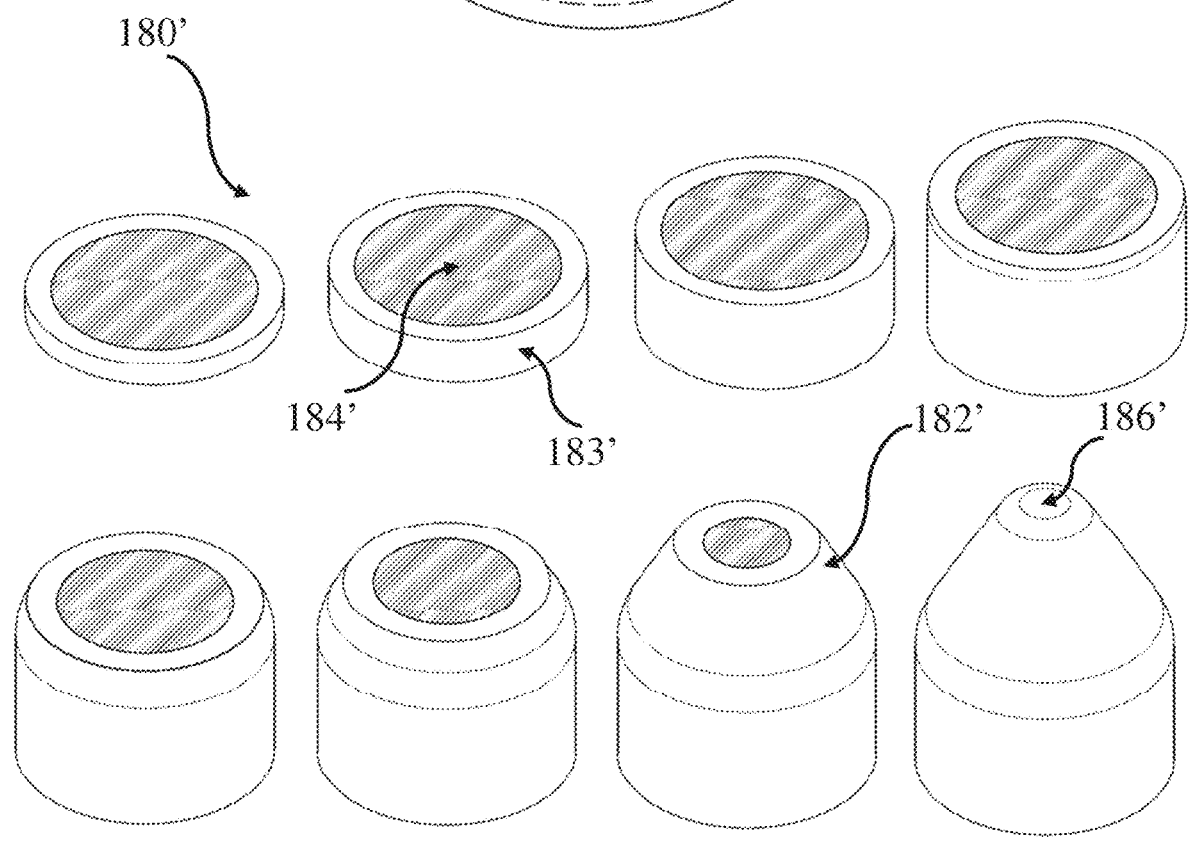
FIG. 18B is a schematic of an exemplary fabrication steps for hollow composite structure utilizing dissolvable metallic support material, fabricated according to the teachings of the current disclosure.
Figure 19:
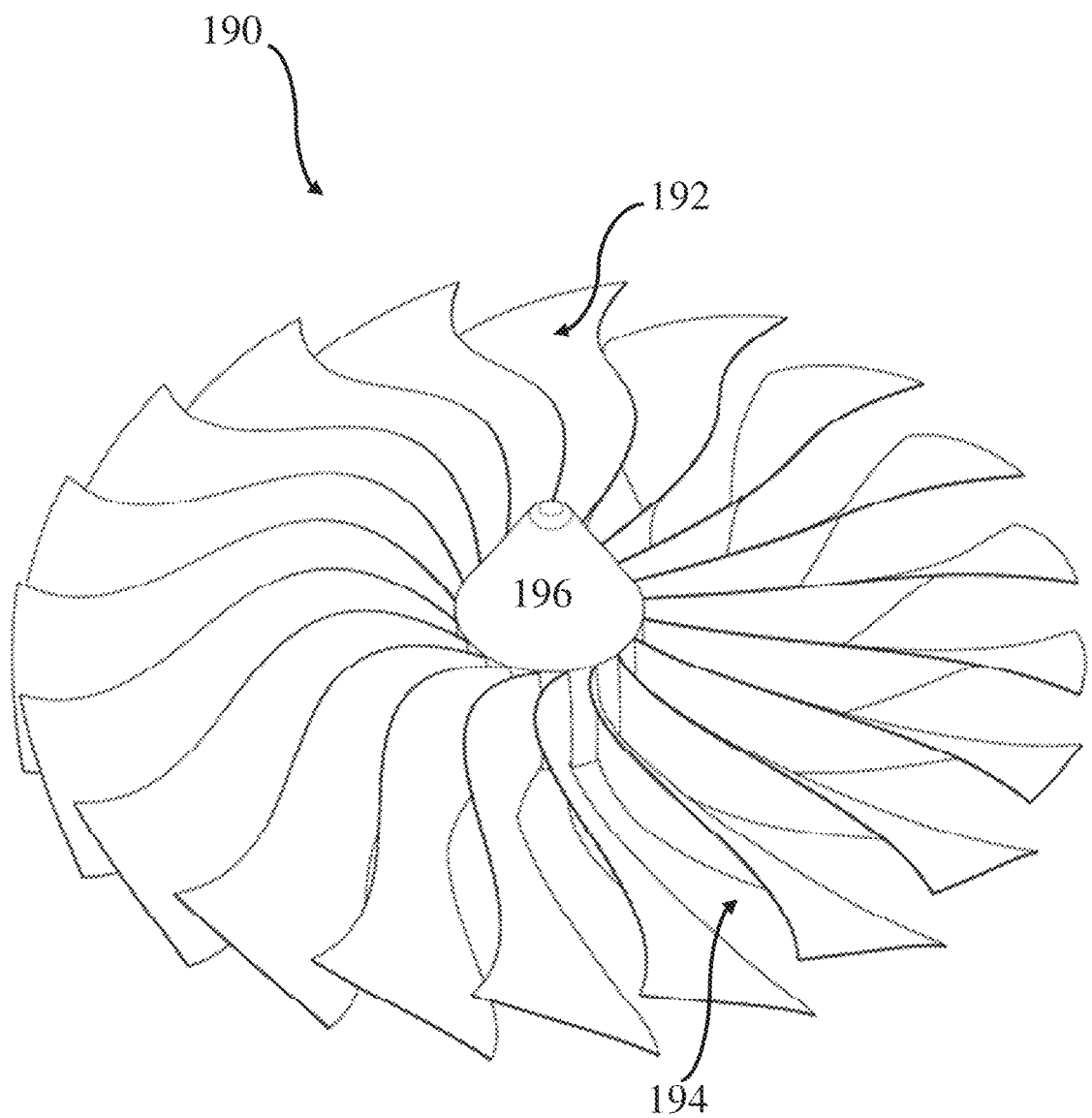
FIG. 19 is a schematic of an exemplary fan having composite blades fabricated according to the teachings of the current disclosure.

Now referring to FIG. 18B, the fabrication method may include the consolidation the support structure 182' along with 184' in accordance to the teaching of the present disclosure. The support structure would enable the fabrication of the overhang feature. When complete, the structure will be submerged in water to dissolve the support material. Such support material can also be used in many other additive manufacturing process that employ metallic materials, enabling fabrication complex objects with overhang features. FIG. 19 illustrates a fan comprising of composite blades 192 with overhang profile. This fan can be fabricated employing the support material into inter-blade gap 194 and fabrication method disclosed herein. The conceptual examples presented here are not exhaustive and do not limit the scope of the present teachings.

EXAMPLES

Example 1: Reinforced Composite Fabrication with Weaved Carbon Preform

Figure 20A:
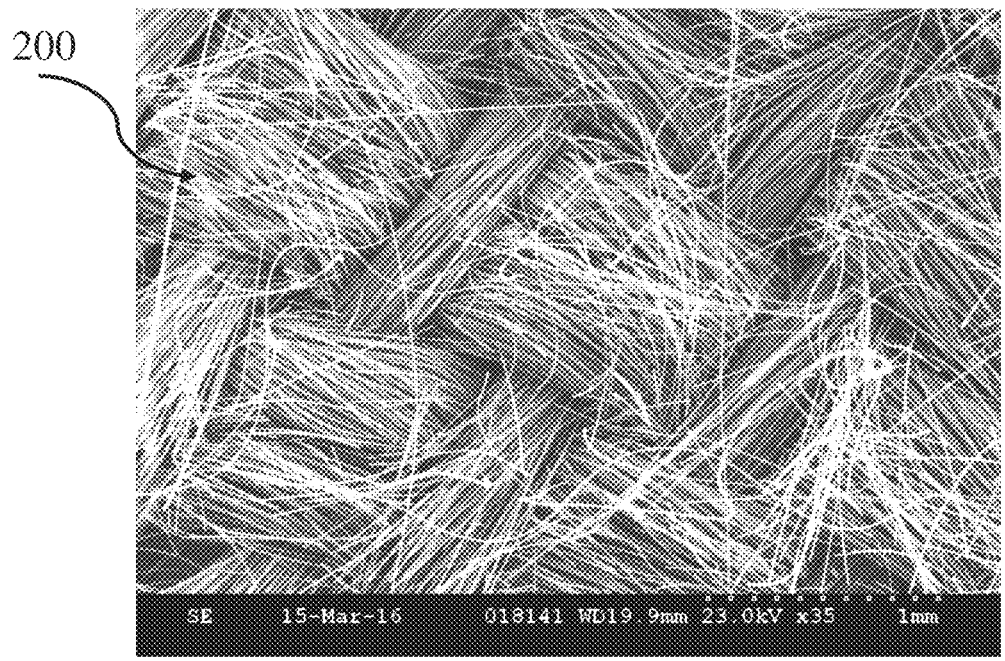
FIG. 20A is the Scanning Electron Microscope picture of an exemplary carbon fiber preform.
Figure 20B:
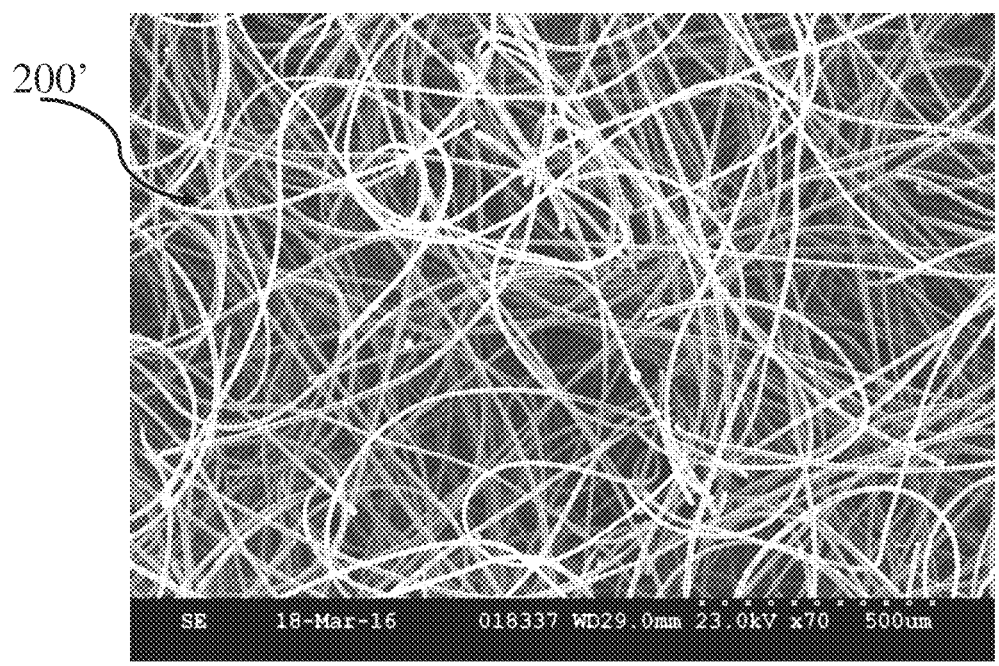
FIG. 20B is the Scanning Electron Microscope picture of an exemplary graphite fiber felt.

For comparative example A, additive fabrication of Carbon-titanium composite layers was carried out utilizing weaved carbon fabric preform 200 shown in FIG. 20A. The carbon fiber preform was procured from Kharkov Institute of Physics and Technology (KIPT), Ukraine. As seen in this scanning electron microscope (SEM) picture, the fiber bundles used in the weaving are unbraided. The preform thickness was used in this experiment was 0.5 mm.

Pure vacuum atomized titanium powders with an average diameter of 45 microns were used to form the matrix. The titanium powder was procured from Advanced Powders & Coatings, Quebec, Canada. The experiments were conducted inside an argon filled chamber to prevent oxidation of titanium as well as burning of the carbon fiber. A 1 kW disc laser (1030 nm wavelength) with fiber optics delivery system was used as the auxiliary energy beam. The laser spot size was maintained at 2 mm. Initial experiments were conducted according to the teachings of prior art cited in this disclosure for comparative purpose. First, a layer of titanium powder was delivered via a powder feeder onto a plate. Then a fiber preform was placed on the powder layer. The laser was scanned on the preform at various powers (400, 600 and 800 W) as well as scan rates (200, 400 and 600 mm/min) to impregnate the underlying powder into the preform. As can be seen from the SEM picture (FIG. 20A), due to high fiber density, the laser beam couldn't pass through the preform layer and was absorbed resulting in a red hot preform. Post experiment examination revealed that most of the underlying powder was left unfused except the ones directly under the weave intersection points.

Figure 21A:
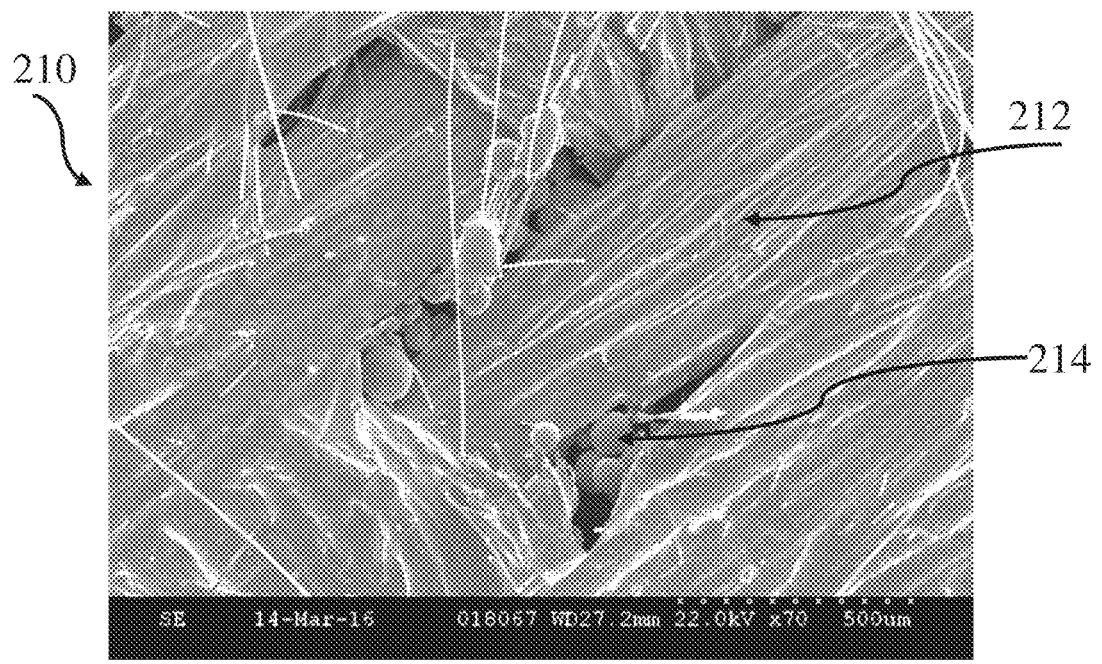
FIG. 21A is the Scanning Electron Microscope picture of a carbon fiber preform reinforced-titanium composite fabricated by laser melting according to the teachings of prior art.
Figure 21B:
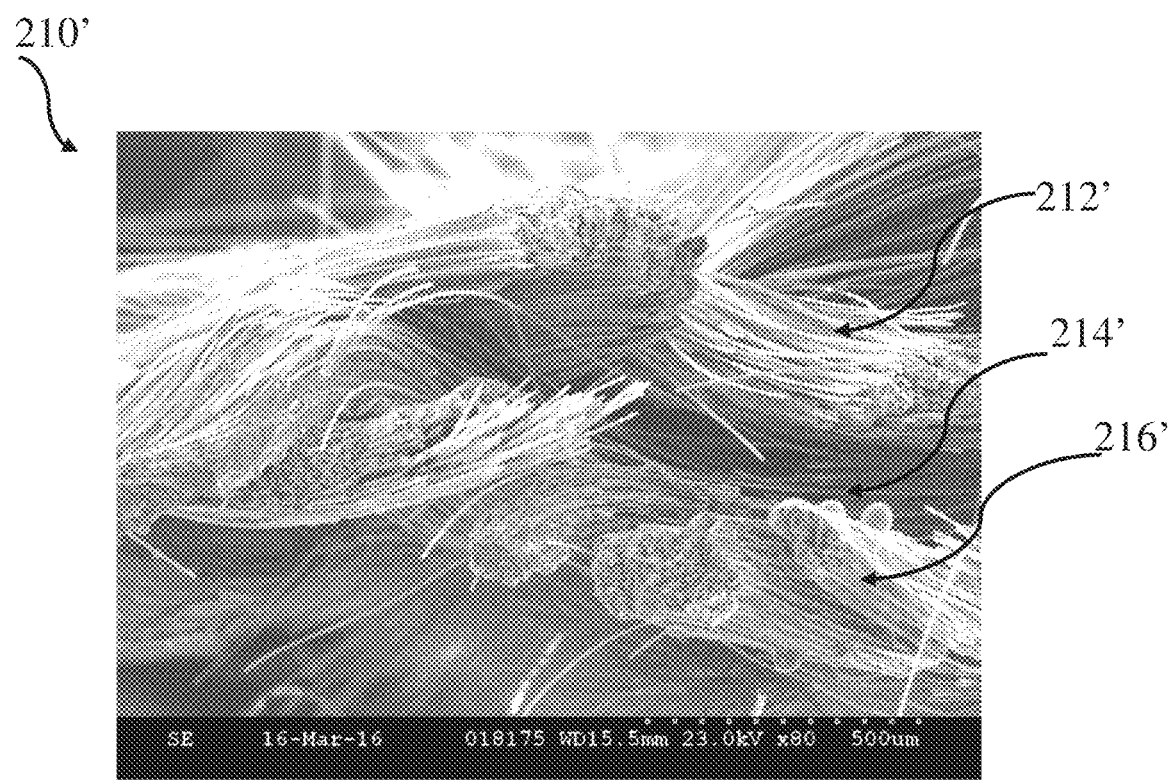
FIG. 21B is the Scanning Electron Microscope picture of the internal voids of a carbon fiber preform reinforced-titanium composite fabricated by laser melting according to the teachings of prior art.

To prepare Comparative Sample B, the preform was placed on the plate first and then the powder was delivered onto the preform while scanning the laser beam. Above mentioned power level as well as scan rates were tested. The best resulting sample picture is shown in FIG. 21A. As can be seen, the powders spread on the fiber bundles 212 were impregnated into the preform, whereas the weave intersection gaps 214 were left with uninfiltered powders. Multiple laser passes did melt those powders, however, the liquid metal flowed to the bottom fiber bundles, leaving gaps inside the preform. FIG. 21B shows the cross section of the sample of FIG. 21A. As can be seen, the liquid has infiltrated into the bottom fiber bundle 216', leaving the gap 214' inside the preform. Further, the liquid has also flowed out of some top fiber bundles 212', due to high temperatures experienced on the top by multiple laser scanning. It is known that high liquid temperatures promote infiltration, however, high fluidity is not advantageous for free form fabrication as well as lead to detrimental interfacial reaction.

Figure 22A:
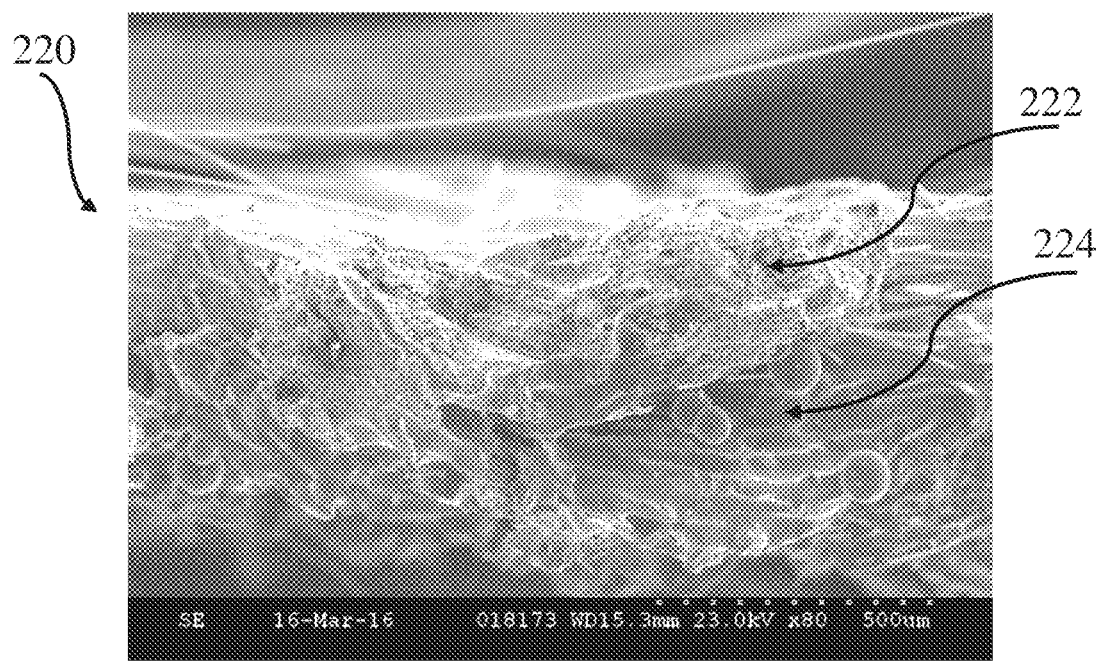
FIG. 22A is the Scanning Electron Microscope picture of the cross section of an exemplary carbon fiber preform reinforced-titanium composite fabricated according to the teachings of the current disclosure.
Figure 22B:
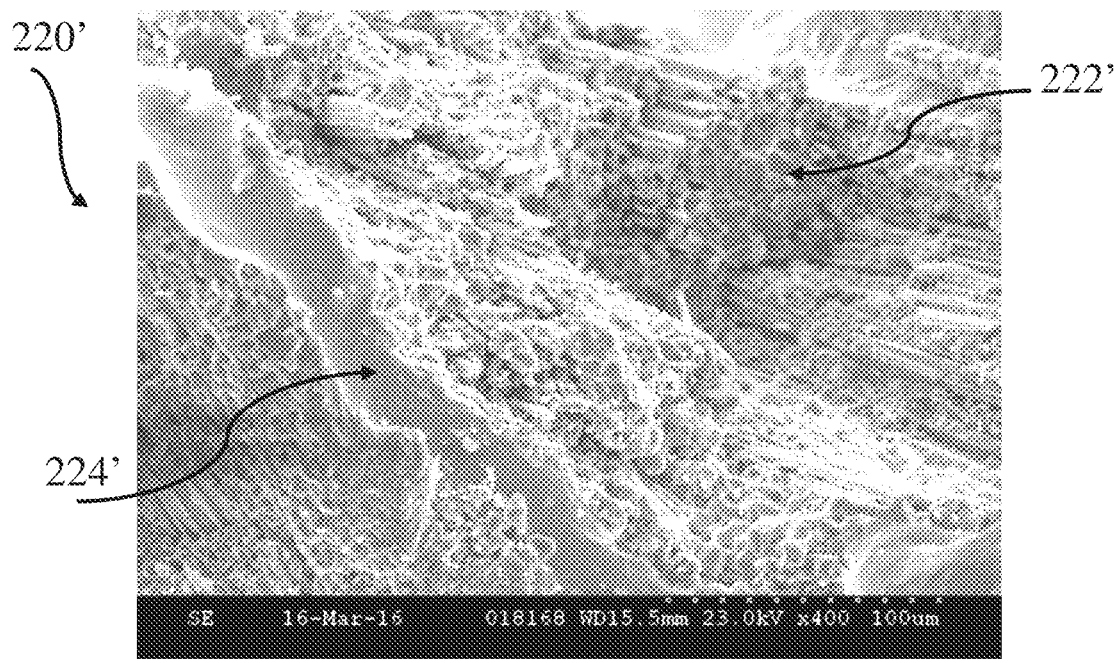
FIG. 22B is the Scanning Electron Microscope picture of an exemplary carbon fiber preform reinforced-titanium composite fabricated according to the teachings of the current disclosure, showing complete impregnation of the titanium.

FIGS. 22A and 22B present the results of composites of Samples A and B, fabricated according to the teachings of the present disclosure. Two metal electrodes (3 cm diameter and 0.5 cm width) with 2 cm gap between them were placed on the preform and connected to a 12 VDC power supply and 30 Amp current was applied. An ultrasonic wave of 200 kHz and amplitude of 0.1 mm was applied to the preform according to the teachings of this disclosure. Further, the auxiliary laser power was kept at 400 W such that the liquid metal could impregnate the preform but didn't flow out of the designated preform zone. As seen in FIG. 22A, the fiber bundle 222 is completely filled (impregnated) with titanium which didn't drip out although there was empty space 224 below it. As mentioned earlier, the resistance to infiltrate the inter-fiber space within a bundle is expected to be higher due to high capillary resistance. As shown in FIG. 22B, the inter fiber gaps 222' are completely impregnated due to the ultrasonic action. Also, the powders at the weave intersection gaps 224' were completely impregnated and consolidated. In summary, the benefits of the current teachings compared to prior methods in successfully fabricating a preform reinforced composite layer is evident in this example.

Example 2: Flow Through Electrode with Graphite Felt

Figure 23:
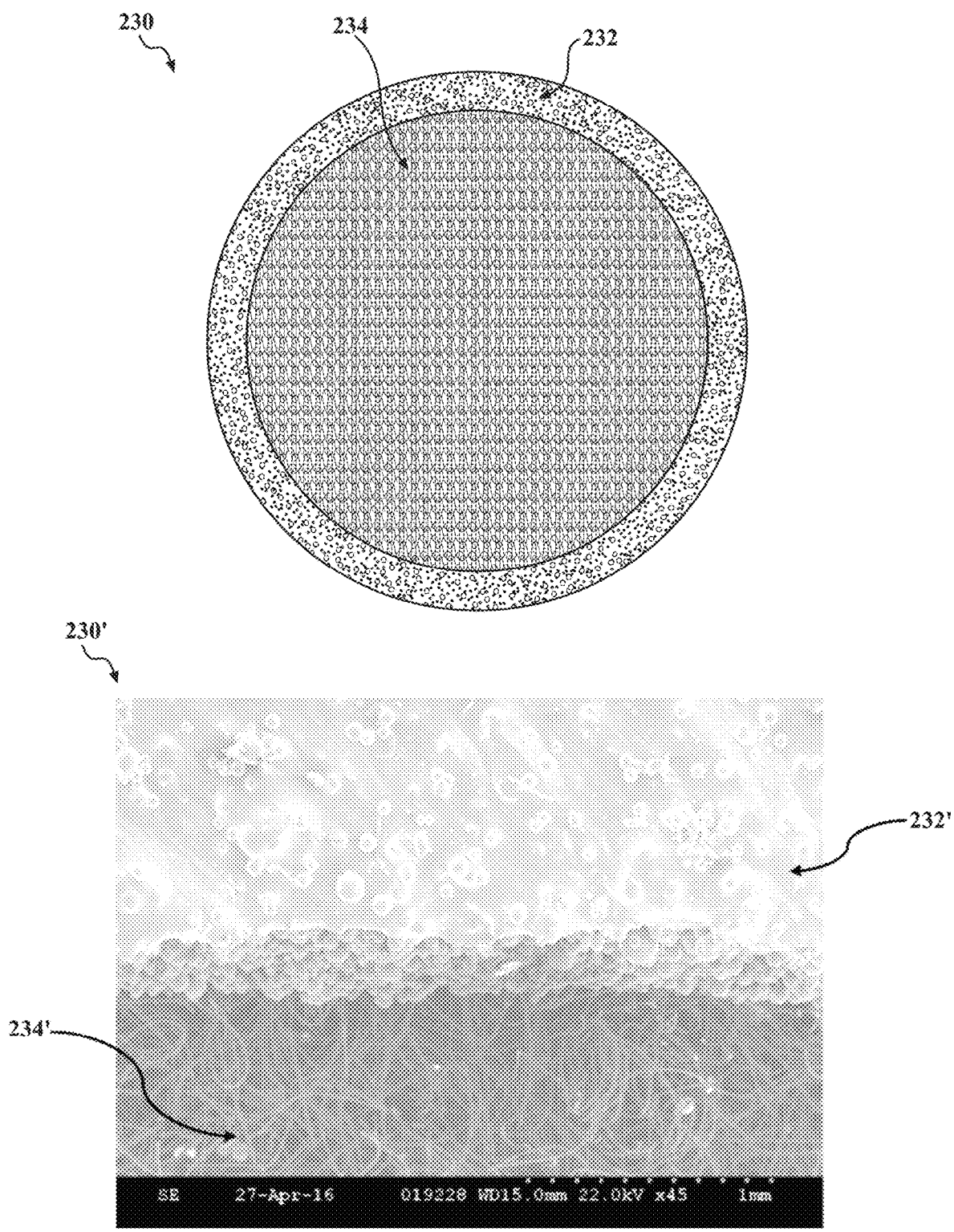
FIG. 23 is an exemplary electrode for an electrochemical process having porous graphite felt preform region and composite boundary for mechanical fastening, fabricated according to the teachings of the current disclosure.

The fabrication of a flow through electrode 160 (FIG. 16) for electrochemical cells, employing the teachings of the present disclosure is presented in this example. To prepare Sample C, a graphite felt presented in FIG. 20B was used as the preform. The activated graphite felt was procured from Ceramaterials, Port Jervis, N.Y. As shown in the picture (FIG. 20B), the fibers were not woven and were randomly distributed. The graphite felt preform thickness was 1.5 millimeters (mm). Again, the titanium powder and the deposition parameters of Example 1 were used in this experiment. FIG. 23 presents the flow through electrode fabricated according to the method disclosed in this invention. The electrode 230 includes the graphite-titanium composite frame 232 and the flow through graphite fiber region 234. The press roll was not deployed in this experiment. The SEM picture 230' further shows the composite area 232' and the porous flow through area 234' of Sample C. As seen in this picture, the titanium in Sample C was able to impregnate the preform in a semi-molten state leaving the appearance of some partially molten powder. The ability to impregnate semi-molten metal into the preforms with ultrasonic wave, according to the teachings disclosed herein, provides tremendous advantage in terms of managing the thermal profile, interfacial reactions as well as the integrity of the composite object.

Figure 24:
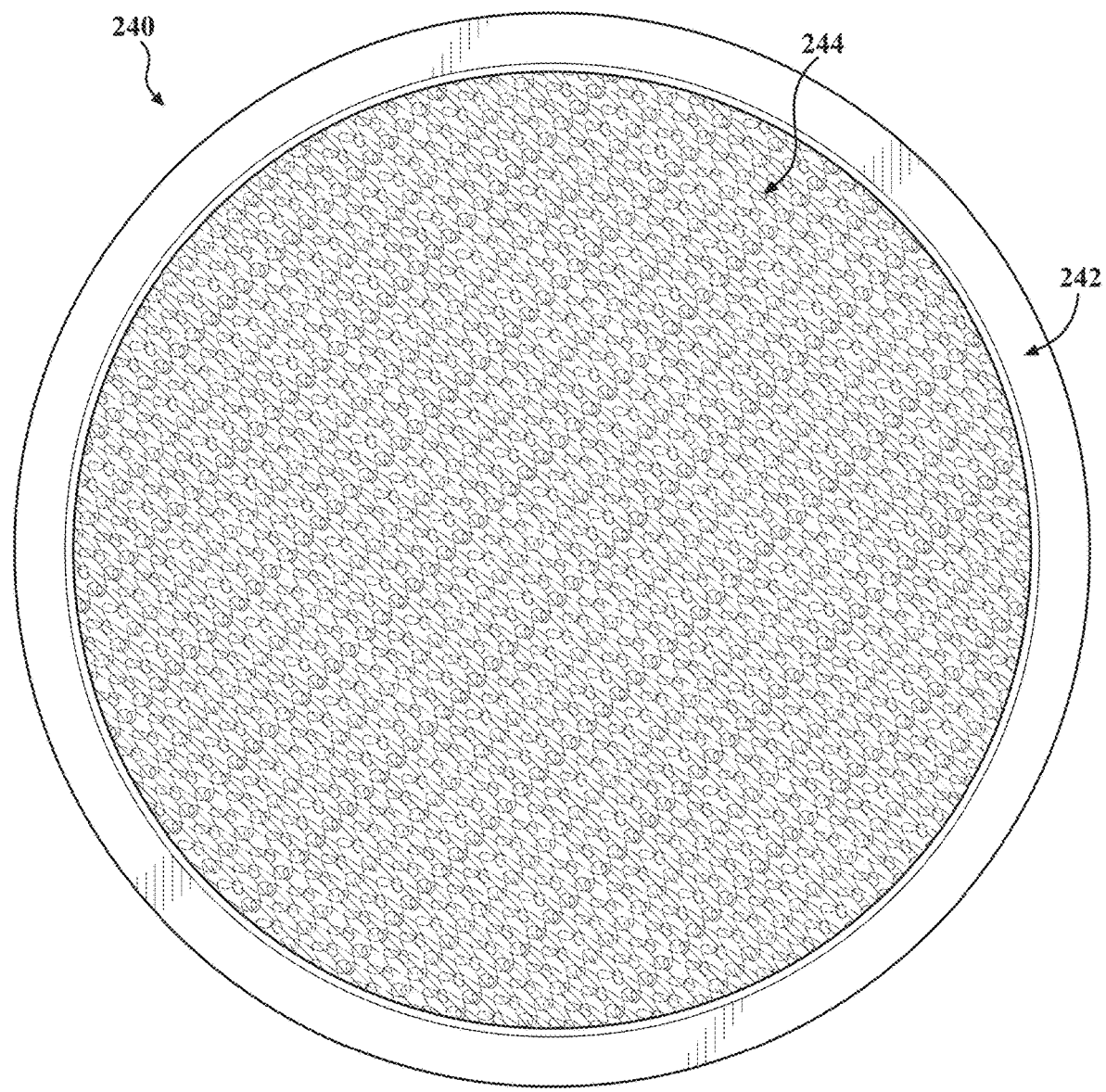
FIG. 24 is an exemplary electrode for an electrochemical process having porous carbon fiber preform region and composite boundary for mechanical fastening, fabricated according to the teachings of the current disclosure.

Further, a flow through electrode comprising woven carbon fiber cloth was fabricated according to the teachings of the present disclosure. Eight layers of the cloth were consolidated layer by layer to form Sample D, as shown in FIG. 24. The deposition parameters were kept same as for Sample C above. Additionally, a press roll (1 cm diameter and 2 cm width) was utilized as taught in this disclosure. The benefits of the press roll is evident from the flat surface 242 (Sample D) of the composite layer compared to that of FIG. 23 (Sample C).

Example 3: Dissolvable Metallic Support Material

Figure 25:
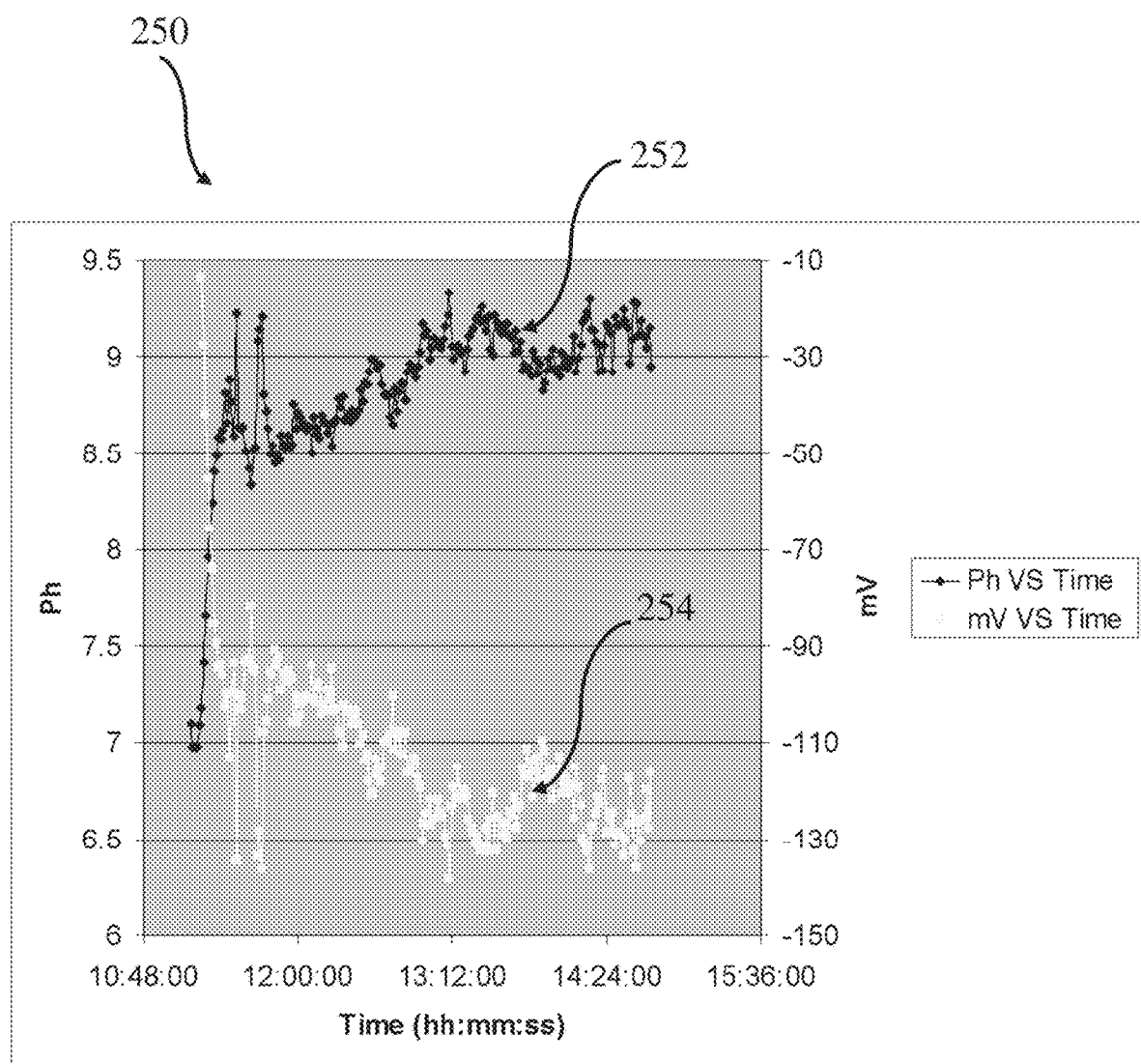
FIG. 25 graphically depicts the pH and voltage change as a function of time against a counter electrode observed during the dissolution of an exemplary metallic support material of the current disclosure.
Figure 26:
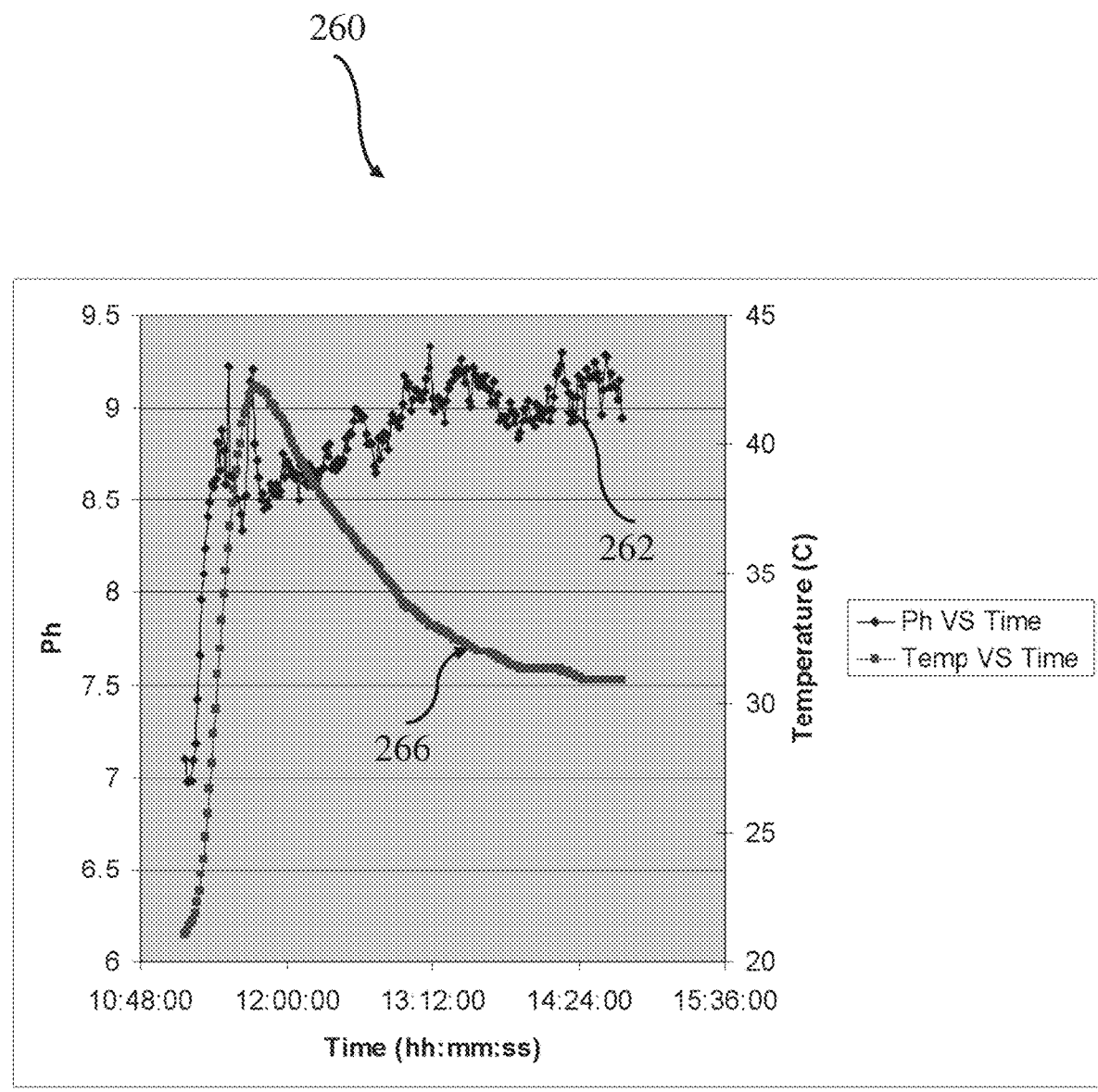
FIG. 26 graphically depicts pH and temperature change a function of time observed during the dissolution of an exemplary metallic support material of the current disclosure.
Figure 27:
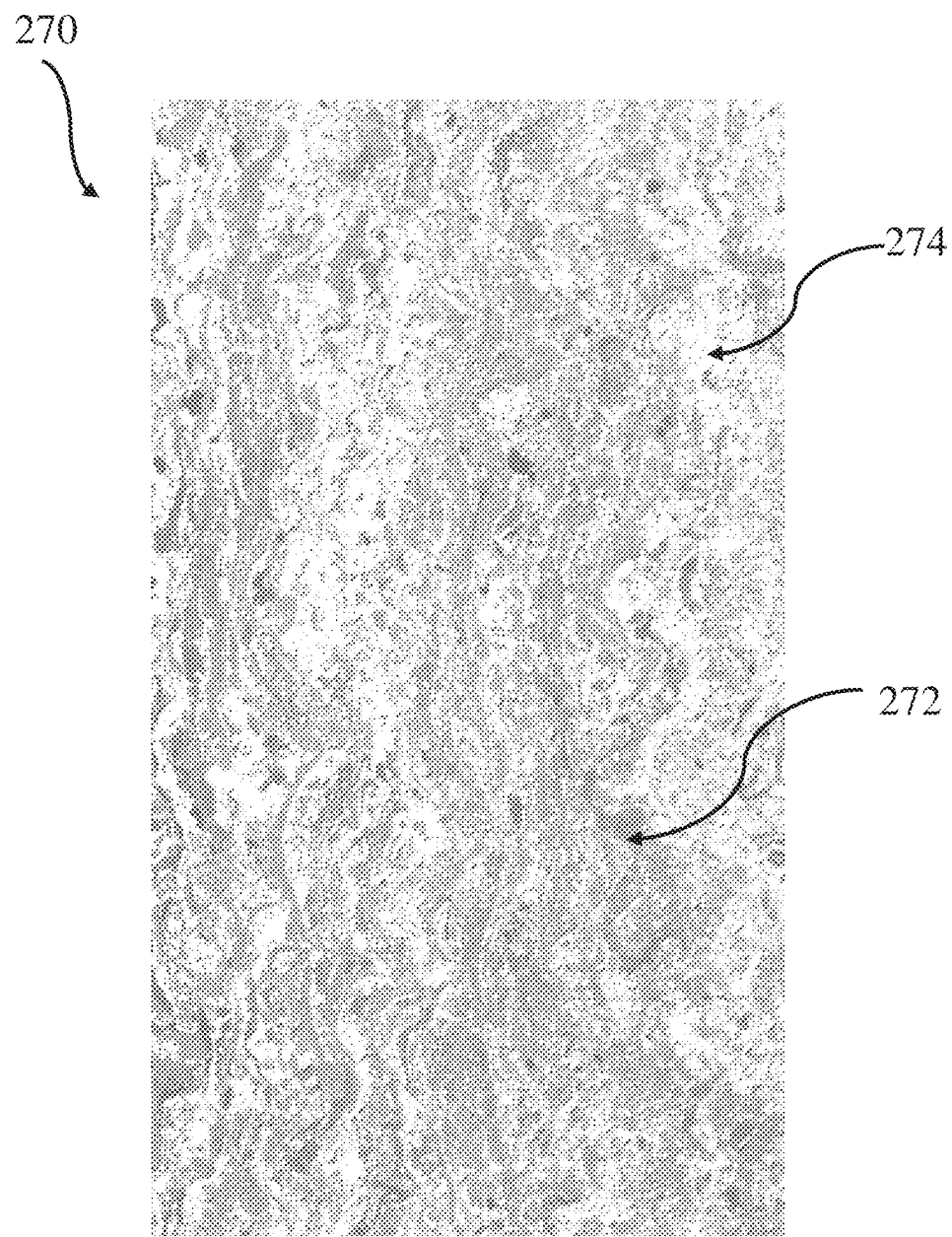
FIG. 27 is the Backscattered Scanning Electron Microscope picture of the metallic support material of the current disclosure.
Figure 28:
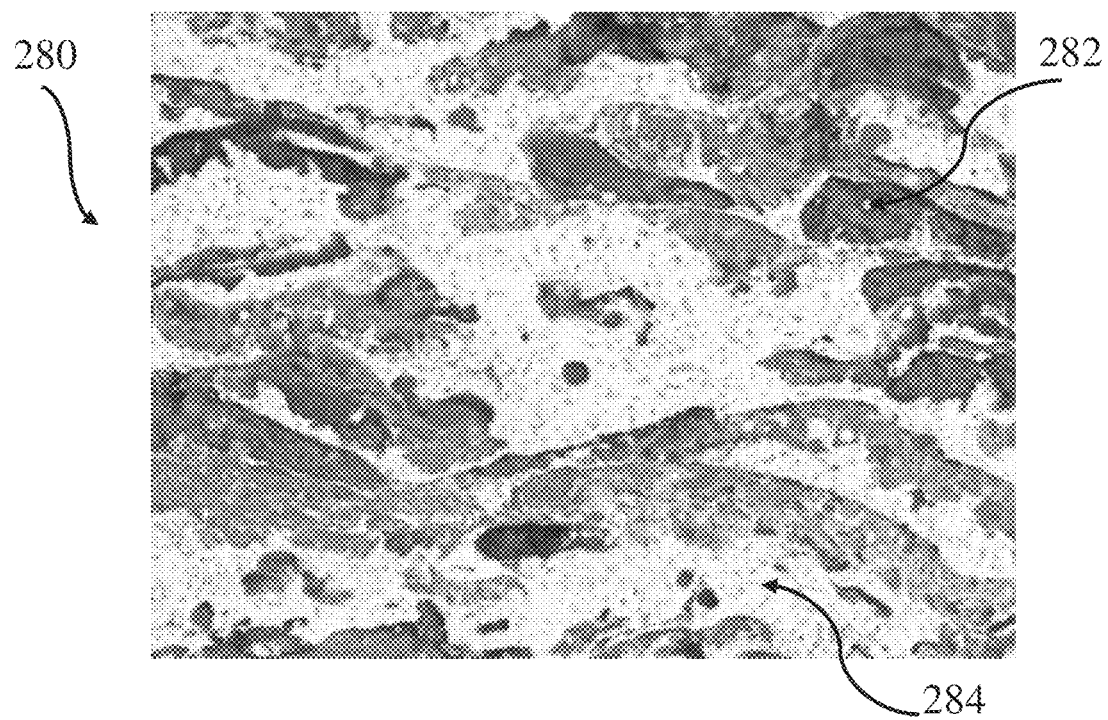
FIG. 28 is the Backscattered Scanning Electron Microscope picture of the partially dissolved metallic support material of the current disclosure.

The fabrication and the dissolution of the water soluble metallic support material is presented in this example. Initially, flat standalone 2"×4"×0.25" samples were fabricated by employing electrical arcing between a pure aluminum wire and a Sn-20Zn wire. The samples were then immersed into a water bath. A counter graphite electrode was employed to measure the voltage generated during the dissolution. Further, the pH and the temperature of the water were also measured. FIG. 25 presents the temporal pH and voltage measurements during the dissolution of the samples. As seen here, the pH 252 increased from 7 to about 9 during the dissolution, whereas the voltage against the graphite electrode was between −90 to −130 mV, suggesting that the dissolution is electrochemical in nature. Further, FIG. 26 presents the temperature 266 of the bath which increased from 25° C. to about 40° C. and then dropped to about 30° C., suggesting and exothermic process. FIG. 27 presents the SEM backscattered microstructure of the support material. As can be seen, the structure is dense, however, it contains very fine discrete phase, the darker 272 being Al and the lighter 274 being primarily Sn. The SEM backscattered microstructure of partially dissolved support material is shown in FIG. 28.

Figure 29:
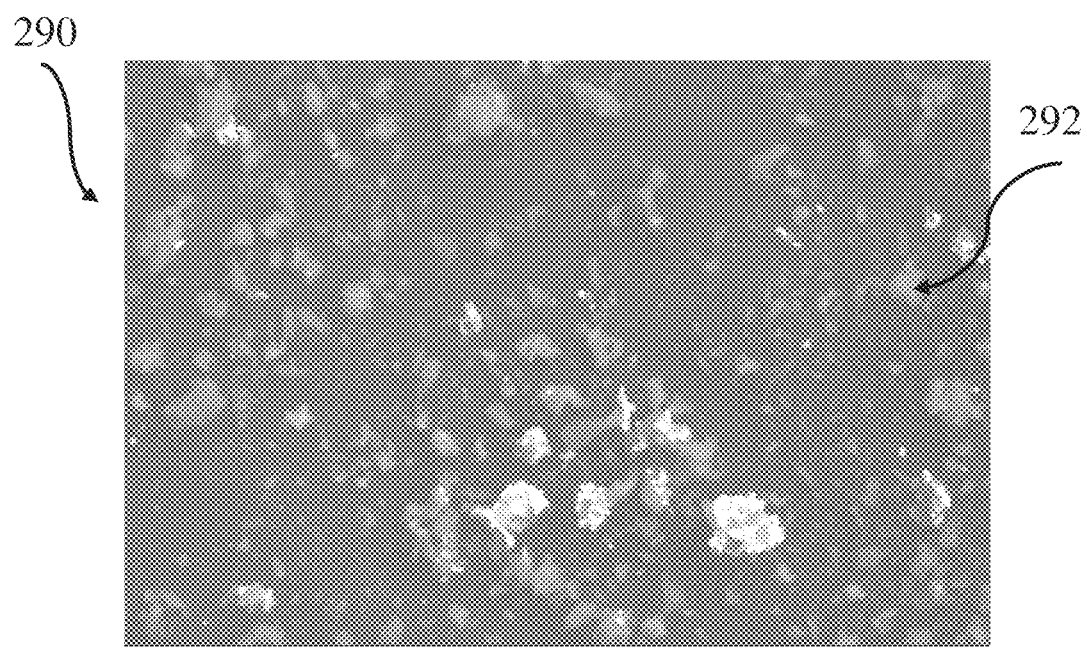
FIG. 29 is the Backscattered Scanning Electron Microscope picture of the residue left after complete breakdown of the metallic support of the current disclosure.
Figure 30:
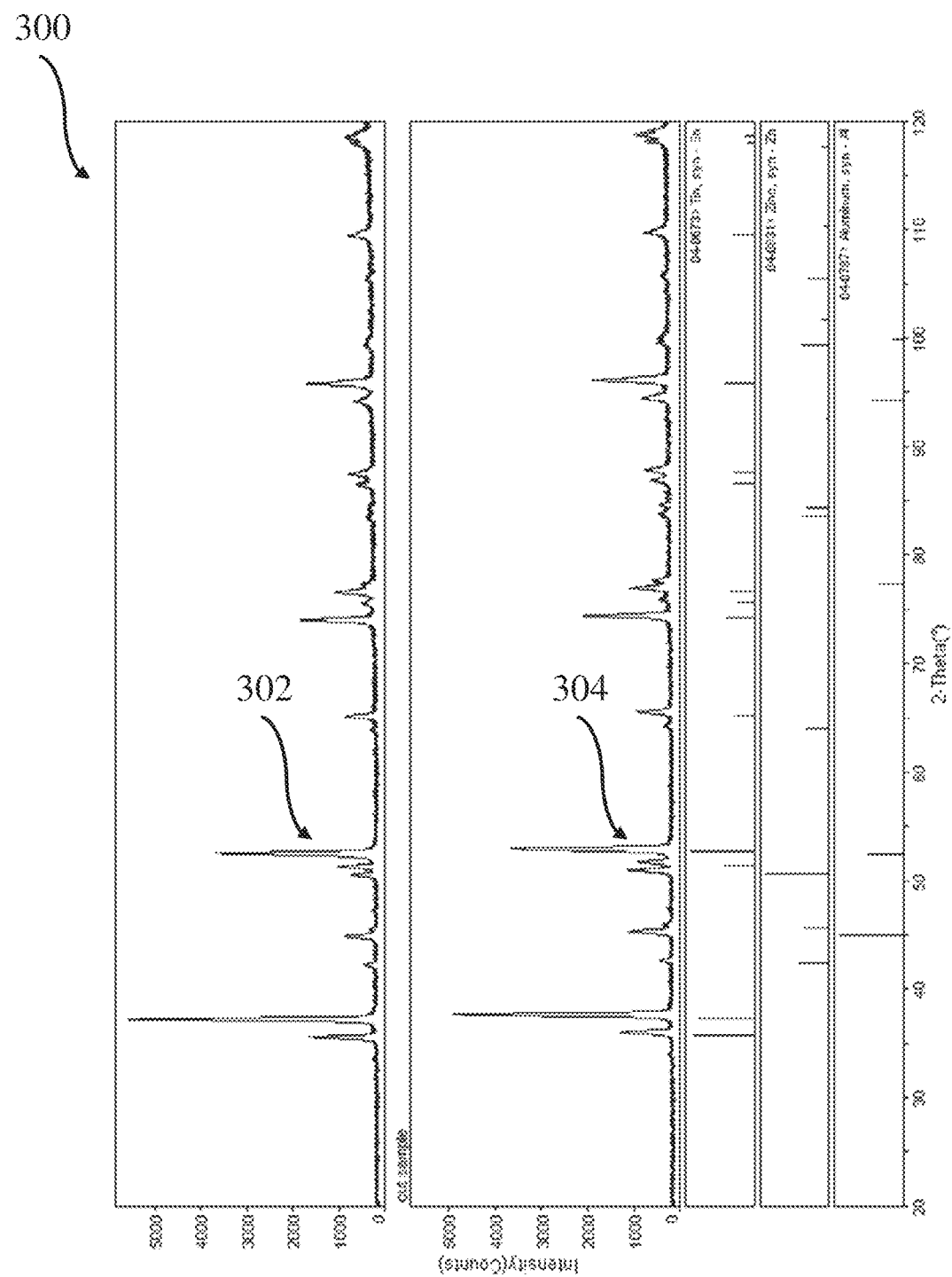
FIG. 30 are the x-ray diffraction patterns of the partially fused and completely melted metallic support material of the current disclosure.

As expected, the Al phase 282 spontaneously dissolves leaving behind the Sn network 284 which eventually crumbles. FIG. 29 shows the residue left behind which contains both Al and Sn—Zn particles. As noted earlier, when the electrical contact is lost, aluminum would no longer spontaneously dissolve. Therefore, a consolidated but discrete phase structure is essential to have spontaneous dissolution characteristics. This is further supported by the observation that when this material was re-melted and re-solidified, it didn't spontaneously dissolve. However, their X-ray diffractions were identical as shown in FIG. 30. Technically, deposited sample 302 and melted sample 304 are identical in terms of their crystallography. However, according to the teachings of this disclosure, the fine discrete phase distribution is critical for spontaneous dissolution.

Figure 31:
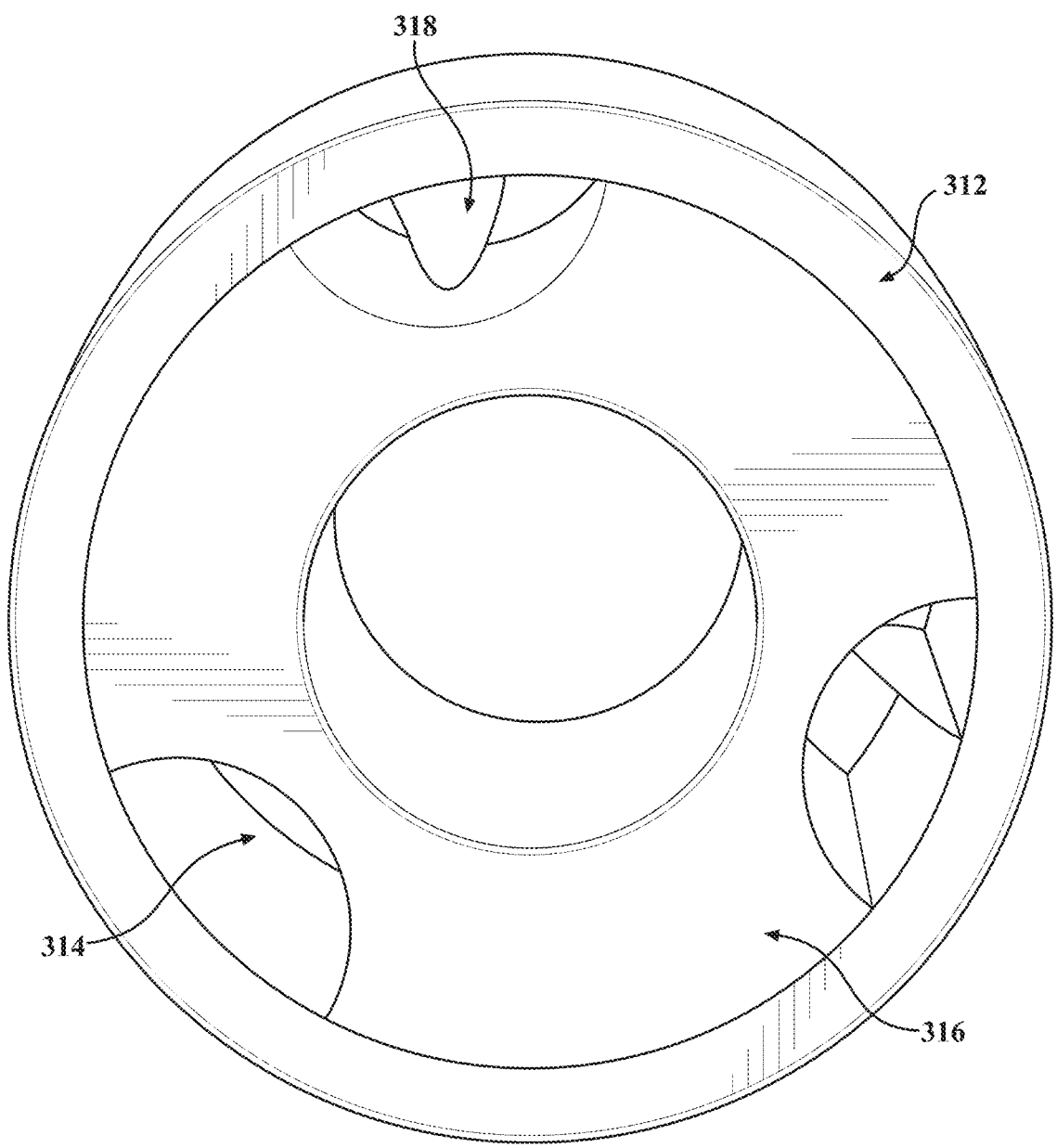
FIG. 31 is a photograph of an additively manufactured object after the dissolution of metallic support material of the current disclosure showing open voids.

FIG. 31 presents an object 310 (Sample E) additively fabricated according to the teachings of this disclosure, comprising a core composite material 316, a metallic skin (copper) 312 and internal features 314. The internal features were originally filled with the water soluble metallic material of the current disclosure. Upon their dissolution the voids were created. In fact, some leftover support material 318 is shown in the picture. This demonstrates the advantage of the disclosed metallic support material which can be co-deposited with high temperature materials such as copper, but can be dissolved with water to provide complex internal profiles. Many complex features can be created with the help of this support material.

Various aspects can be described with reference to the following clauses, with preferred features laid out in dependent clauses:

1. A method of forming a reinforced composite, optionally as a layer of a part, comprising: optionally disposing a fiber preform on a target platform; applying an electrical voltage through a pair of electrodes to the fiber preform; disposing a layer of powder onto at least a portion of the heated fiber preform; and impregnating the powder into the fiber preform, thereby forming a reinforced composite.

2. The method of the preceding clause, wherein the fiber preform comprises a non-conductive fiber, wherein applying the electrical voltage generates a surface plasma on the fiber preform.

3. The method of any preceding clause, wherein impregnating the powder further comprises projecting a directed energy beam onto the powder to at least partially melt the powder.

4. The method of clause 3, wherein the directed energy beam is produced by a laser.

5. The method of clause 3, wherein the directed energy beam comprises an electron beam.

6. The method of clause 3, wherein the directed energy beam comprises a plasma jet.

7. The method of any preceding clause, wherein the fiber preform has a melting point that is greater than a melting point of the powder.

8. The method of any preceding clause, further comprising providing ultrasonic waves to the at least a portion of the heated fiber preform.

9. The method of any preceding clause, wherein the electrical voltage is applied at a current of between 1 Ampere and 100 Amperes, optionally at a voltage of 10 VDC to 100 VDC, optionally a current of 1 kV to 10 kV and optionally with a current of 0.01 A to 0.5 A.

10. A device comprising: a pair of electrodes (optionally electrode rolls) operable to apply a voltage across at least a portion of a fiber preform effective to heat the portion of the fiber preform; a powder delivery channel; and a powder delivery roll in communication with the powder delivery channel and configured to dispose a layer of a powder onto the heated portion of the fiber preform.

11. The device of clause 10, further comprising a compression roll.

12. The device of clause 10 or 11, further comprising an ultrasonic transducer configured to provide an ultrasonic wave to the heated portion of the fiber preform.

13. The device of clause 12, wherein the ultrasonic transducer comprises a pair of ultrasonic transducers, optionally transducer rolls.

14. The device of clause 13, wherein one ultrasonic transducer of the pair of ultrasonic transducers is configured to transmit the ultrasonic wave and the other ultrasonic transducer of the pair of ultrasonic transducers is configured to receive the ultrasonic wave.

15. The device of clause 13, wherein each ultrasonic transducer in the pair of ultrasonic transducer is configured to induce ultrasonic waves.

16. The device of any of clauses 13-15, wherein the pair of ultrasonic transducers are positioned between the pair of electrodes, or between a compress roll and the pair of electrodes.

17. The device of any of clauses 10-16, further comprising an enclosure configured to maintain a process atmosphere around the heated portion of the fiber preform.

18. The device of clause 17, further comprising a gas delivery channel for providing a cover gas to the enclosure.

19. The device of clause 18, wherein the cover gas comprises an inert gas.

20. The device of any of clauses 17-19, further comprising a gas release passage.

21. The device of any of clauses 10-20, wherein a first electrode roll of the pair of electrode rolls is parallel to a second electrode roll of the pair of electrode rolls.

22. The device of any of clauses 17-19 wherein the enclosure is located on an elevated plane compared to the pair of electrode rolls and the powder delivery roll.

23. The device of any of clauses 10-22, further comprising a directed energy delivery system configured to deliver energy in the form of an energy beam to the layer of powder disposed on the fiber preform effective to at least partially melt the layer of powder.

24. The device of clause 23, wherein the energy beam comprises a laser beam, an electron beam, or a plasma beam.

25. An additive manufacturing system comprising: the device according to any of clauses 10-24; a preform delivery mechanism configured to deliver the fiber preform; and a target platform operatively connected to the preform delivery mechanism on which an object having the fiber preform impregnated with a matrix formed from the layer of the powder is formed.

26. A method for determining the presence of one or more flaws during additive fabrication, comprising: introducing a first ultrasonic wave into a part; detecting a second ultrasonic wave emanating from the part, the second ultrasonic wave being associated with the first ultrasonic wave; comparing the second ultrasonic wave with a reference signal, the reference signal derived from a signal associated with a known part in a complete impregnated state or optionally a known preform that is not impregnated or is only partially impregnated; and determining the presence of one or more flaws based on the comparing.

27. The method of clause 26, further comprising: generating a reference signal for the known part; and storing the reference signal in a database.

28. The method of clause 26 or 27, wherein determining the presence of one or more flaws comprises determining the presence of one or more flaws when the second ultrasonic wave does not match the reference signal.

29. The method of any of clauses 26-28, further comprising: selecting a reference signal based on one of an amount of powder disposed on the part prior to the powder impregnating the part; a temperature, or a number of layers in the part.

30. The method of any of clauses 26-29, wherein: introducing the first ultrasonic wave comprises introducing a first ultrasonic wave using an ultrasonic wave transducer; detecting the second ultrasonic wave comprises using an ultrasonic wave receiver; and the ultrasonic wave transducer and the ultrasonic wave receiver are separated from one another by a gap having a length of from 1 mm to 20 cm.

31. The method of clause 30, further comprising: selecting an amplitude for the first ultrasonic wave based at least in part on the length of the gap separating the ultrasonic wave transducer and the ultrasonic wave receiver.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

PATENT DOCUMENT REFERENCES

| | | |
|---|---|---|
| U.S. Pat. No. 5,495,979 | March 1996 | Sastri et al. |
| U.S. Pat. No. 5,518,383 | May 1996 | Abiven. |
| CA 2368680 A1 | August 2001 | Osborne et al. |
| EP 1 820 870 A1 | August 2007 | Ono et al. |
| U.S. Pat. No. 7,407,901 B2 | August 2008 | Bystricky et al. |
| U.S. Pat. No. 8,043,703 B2 | October 2011 | Cornie et al. |
| US 2012/0037602 A1 | February 2012, | Doorbar. |
| U.S. Pat. No. 8,448,837 B2 | May 2013 | Dambrine et al. |
| U.S. Pat. No. 8,501,048 B2 | August 2013 | Ueno et al. |
| US 2015/0375340 A1 | December 2015 | Cui et al. |

NON-PATENT REFERENCES

Guan et al. (2013), Threshold pressure and infiltration behavior of liquid metal into fibrous preform, Trans. Nonferrous Met. Soc. China, 23, pp. 3173-3179.

Pippel et al. (2000), Interlayer structure of carbon fibre reinforced aluminium wires, Journal of Materials Science, 35, pp. 2279-2289.

Lee et al. (2010), Preparation of Unidirectional Carbon Fiber Preform for Aluminium Matrix Composites, Materials Transactions, 52(5), pp. 939 to 942.

Gibson et al. (2016), Hybrid Joining Through Additive Manufacturing, Challenges in Mechanics of Time Dependent Materials, Volume 2, B. Antoun (ed.), pp. 91 to 99.

What is claimed is:

1. A method of forming a reinforced composite layer comprising:
    disposing a fiber preform on a target platform;
    placing a pair of electrodes onto a single surface of the fiber preform with a gap between the electrodes;
    applying an electrical voltage through the pair of electrodes and across the gap of the fiber preform to generate a surface plasma on the fiber preform;
    disposing a layer of metal powder onto at least a portion of the heated fiber preform; and
    impregnating the metal powder into the fiber preform, thereby forming, a reinforced composite layer.

2. The method of claim 1, wherein impregnating the powder further comprises projecting a directed energy beam onto the powder to at least partially melt the powder.

3. The method of claim 2, wherein the directed energy beam is produced by a laser, and electron beam, a plasma jet, or combinations thereof.

4. The method of claim 1, further comprising providing ultrasonic waves to the at least a portion of the fiber preform.

5. The method of claim 1, wherein the electrical voltage is applied at a current of 1 Ampere to 100 Amperes.

* * * * *